US009116624B2

(12) United States Patent
Canepa et al.

(10) Patent No.: US 9,116,624 B2
(45) Date of Patent: Aug. 25, 2015

(54) SCALABLE STORAGE DEVICES

(71) Applicant: Seagate Technology LLC, Cupertino, CA (US)

(72) Inventors: Timothy Lawrence Canepa, Los Gatos, CA (US); Carlton Gene Amdahl, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/197,010

(22) Filed: Mar. 4, 2014

(65) Prior Publication Data

US 2014/0258598 A1    Sep. 11, 2014

Related U.S. Application Data

(63) Continuation of application No. 13/702,976, filed as application No. PCT/US2011/040996 on Jun. 17, 2011, now Pat. No. 8,677,068.

(60) Provisional application No. 61/497,525, filed on Jun. 16, 2011, provisional application No. 61/356,443, filed on Jun. 18, 2010.

(51) Int. Cl.
*G06F 12/00* (2006.01)
*G06F 13/00* (2006.01)
*G06F 13/28* (2006.01)
*G06F 3/06* (2006.01)
*G06F 13/40* (2006.01)

(52) U.S. Cl.
CPC .............. *G06F 3/061* (2013.01); *G06F 3/0604* (2013.01); *G06F 3/067* (2013.01); *G06F 3/0626* (2013.01); *G06F 3/0631* (2013.01); *G06F 3/0659* (2013.01); *G06F 3/0664* (2013.01); *G06F 3/0683* (2013.01); *G06F 3/0688* (2013.01); *G06F 12/00* (2013.01); *G06F 13/4022* (2013.01); *G06F 2213/0026* (2013.01)

(58) Field of Classification Search
CPC ..... G06F 3/0604; G06F 3/061; G06F 3/0626; G06F 3/0631; G06F 3/0659; G06F 3/0662; G06F 3/0664; G06F 3/067; G06F 3/0683; G06F 3/0688; G06F 13/4022; G06F 2213/0026
See application file for complete search history.

(56) References Cited

U.S. PATENT DOCUMENTS

| 6,654,831 | B1 * | 11/2003 | Otterness et al. | 710/74 |
| 7,574,443 | B2 * | 8/2009 | Bahar et al. | 1/1 |
| 2011/0055293 | A1 * | 3/2011 | Tevis et al. | 707/812 |

*Primary Examiner* — Cheng-Yuan Tseng
*Assistant Examiner* — Rocio Del Mar Perez-Velez
(74) *Attorney, Agent, or Firm* — Hall Estill Attorneys at Law

(57) ABSTRACT

Techniques using scalable storage devices represent a plurality of host-accessible storage devices as a single logical interface, conceptually aggregating storage implemented by the devices. A primary agent of the devices accepts storage requests from the host using a host-interface protocol, processing the requests internally and/or forwarding the requests as sub-requests to secondary agents of the storage devices using a peer-to-peer protocol. The secondary agents accept and process the sub-requests, and report sub-status information for each of the sub-requests to the primary agent and/or the host. The primary agent optionally accumulates the sub-statuses into an overall status for providing to the host. Peer-to-peer communication between the agents is optionally used to communicate redundancy information during host accesses and/or failure recoveries. Various failure recovery techniques reallocate storage, reassign agents, recover data via redundancy information, or any combination thereof.

19 Claims, 6 Drawing Sheets

SCALABLE STORAGE DEVICES

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Non-Provisional application Ser. No. 13/702,976, filed 7 Dec. 2012, now U.S. Pat. No. 8,677,068, first named inventor Timothy Lawrence Canepa, and entitled SCALABLE STORAGE DEVICES;

International Application Serial No.: PCT/US2011/040996, filed 17 Jun. 2011, first named inventor Timothy Lawrence Canepa, and entitled SCALABLE STORAGE DEVICES;

U.S. Provisional Application Ser. No. 61/497,525, filed 16 Jun. 2011, first named inventor Timothy Lawrence Canepa, and entitled SCALABLE STORAGE DEVICES; and U.S. Provisional Application Ser. No. 61/356,443, filed 18 Jun. 2010, first named inventor Timothy Lawrence Canepa, and entitled SCALABLE STORAGE DEVICES.

BACKGROUND

1. Field

Advancements in accessing of storage devices are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

LIST OF REFERENCE SYMBOLS IN DRAWINGS

Figure 1A:
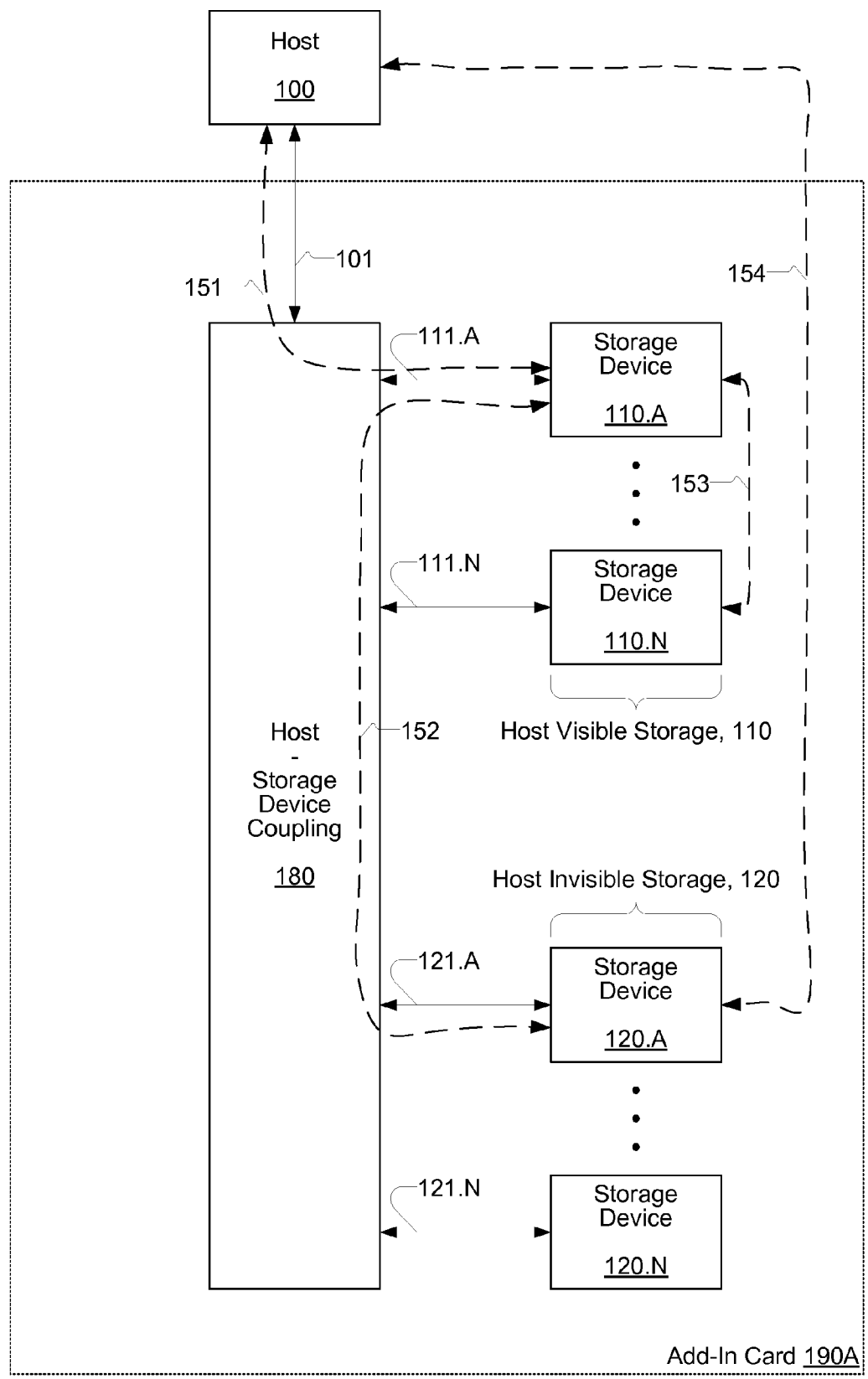
FIG. 1A illustrates selected structural details of an embodiment of a technique for scalable storage devices, including a host, host visible storage having one or more storage devices operable as respective primary agents, and host invisible storage having one or more storage devices operable as respective secondary agents.

| Ref. Symbol | Element Name |
| --- | --- |
| 100 | Host |
| 101 | coupling |
| 110 | Host Visible Storage |
| 110.A | Storage Device |
| 110.N | Storage Device |
| 111.A | coupling |
| 111.N | coupling |
| 120 | Host Invisible Storage |
| 120.A | Storage Device |
| 120.N | Storage Device |
| 121.A | coupling |
| 121.N | coupling |
| 130 | Host Visible Storage |
| 130.A | Storage Device |
| 130.N | Storage Device |
| 131.A | coupling |
| 131.N | coupling |
| 140 | Host Invisible Storage |
| 140.A | Storage Device |
| 140.N | Storage Device |
| 141.A | coupling |
| 141.N | coupling |
| 151 | dashed-arrow |
| 152 | dashed-arrow |
| 153 | dashed-arrow |
| 154 | dashed-arrow |
| 180 | Host - Storage Device Coupling |
| 181 | Device - Storage Device Coupling |
| 190A | Add-In Card |
| 190B | Add-In Card |
| 201 | Start |
| 202 | Accept Req from Host |
| 203 | Local? |
| 203N | No |
| 203Y | Yes |

-continued

| Ref. Symbol | Element Name |
|---|---|
| 204 | Xlate to Local LBAs |
| 205 | Process Locally |
| 206 | Provide Status to Host |
| 207 | Forward to Secondary(s) |
| 207R | Sub-Req |
| 208 | Wait for Completion |
| 209A | Accept Sub-Status from Secondary(s) |
| 209 | Primary Actions |
| 211 | Accept Sub-Req from Primary |
| 212 | Xlate to Local LBAs |
| 213 | Process Locally |
| 214 | Provide Sub-Status to Primary |
| 214S | Sub-Status |
| 219 | Secondary Actions |
| 299 | End |
| 310 | Host Address Space |
| 311 | Host LBA Range 1 |
| 312 | Host LBA Range 2 |
| 313 | Host LBA Range 3 |
| 314 | Host LBA Range 4 |
| 315 | Host LBA Range 5 |
| 320 | Primary Address Space |
| 321 | Primary LBA Range 1 |
| 322 | Primary LBA Range 2 |
| 323 | Primary LBA Range 3 |
| 330 | Secondary Address Space |
| 331A | Secondary A LBA Range 1 |
| 331B | Secondary B LBA Range 1 |
| 332A | Secondary A LBA Range 2 |
| 332B | Secondary B LBA Range 2 |
| 333A | Secondary A LBA Range 3 |
| 401 | PCIe Intfc |
| 402 | LBA, Length Xlate |
| 403 | Storage Intfc |
| 404 | Mass Storage |
| 404F | Flash |
| 404M | Magnetic |
| 404O | Optical |
| 405 | Sub-Request Generation & Sub-Status Accumulation |
| 501 | Sub-Request Accepting & Sub-Status Generation |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations, or acronyms, defined here refer to certain elements used herein.

| Acronym | Description |
|---|---|
| AHCI | Advanced Host Controller Interface |
| CF | Compact Flash |
| DIF | Data Integrity Field |
| DIX | Data Integrity eXtension |
| DMA | Direct Memory Access |
| eNVMHCI | Enterprise Non-Volatile Memory Host Controller Interface |
| eSATA | external Serial Advanced Technology Attachment |
| IC | Integrated Circuit |
| IDE | Integrated Drive Electronics |
| IO | Input/Output |
| JBOD | Just a Bunch Of Disks |
| LBA | Logical Block Address |
| MMC | MultiMediaCard |
| MsgD | Message Request with Data payload |
| PC | Personal Computer |
| PCIe | Peripheral Component Interconnect express (PCI express) |
| PDA | Personal Digital Assistant |
| RAID | Redundant Array of Inexpensive/Independent Disks |
| RMW | Read-Modify-Write |
| ROM | Read Only Memory |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SSD | Solid-State Disk/Drive |
| USB | Universal Serial Bus |

Techniques using scalable storage devices represent a plurality of host-accessible storage devices as a single logical interface, conceptually aggregating storage implemented by the devices. A primary agent of the devices accepts storage requests from the host using a host-interface protocol, processing the requests internally and/or forwarding the requests as sub-requests to secondary agents of the storage devices using a peer-to-peer protocol. The secondary agents accept and process the sub-requests, and report sub-status information for each of the sub-requests to the primary agent and/or the host. The primary agent optionally accumulates the sub-statuses into an overall status for providing to the host. The primary agent reports available storage to the host that includes storage implemented by the primary agent as well as storage implemented by the secondary agents and allocated to aggregating. The secondary agents report zero available storage to the host or alternatively storage remaining after the aggregation allocation.

Peer-to-peer communication between the agents is optionally used to communicate redundancy information during host accesses and/or failure recoveries. Various failure recovery techniques reallocate storage, reassign primary/secondary/configurable agents, recover data via redundancy information, or any combination thereof.

PCIe interfaces have an inherent singular relationship to a host in a system. Each PCIe interface represents a single portal to a function of a device, whether the function is storage, networking, or some other computing system capability. Each PCIe device in the system represents a respective distinct entity in the system. However, through peer-to-peer traffic, several individual PCIe devices are grouped together so that the devices appear as a single PCIe device to the host. By leveraging PCIe peer-to-peer capability, a scalable storage architecture is enabled by ganging and/or grouping together a plurality of PCIe storage devices via peer-to-peer communication enabling the ganged/grouped devices to appear as a single storage subsystem to the host. In some embodiments, requests are distributed among the PCIe storage devices based only on LBAs. The LBA-only distribution does not require that the storage of any particular device in the group be functional for the particular device to route requests, thus eliminating the storage as a single point of failure.

In some embodiments and/or usage scenarios, the ganging/grouping enables increased performance and/or capacity while appearing to the host as a single logical interface. In some embodiments and/or usage scenarios, all single points of storage failure are eliminated via LBA-based request routing. In some embodiments and/or usage scenarios, the ganging/grouping distributes request load across a number of storage devices, thus scaling capacity and performance transparently to a host. The capacity and performance scaling are transparent to the host in the sense that the host does not need to control and requires no observability of the ganging/grouping, other than capacity and latency changes. In some embodiments and/or usage scenarios, the ganging/grouping provides for a symmetric multi-processor storage complex.

In some embodiments and/or usage scenarios, the ganging/grouping enables a host to access, as a single logical device, an aggregation of resources distributed over a plurality of physical devices. For example, the ganging/grouping enables a host to access, as a single logical storage device, an aggregation of a plurality of storage ranges distributed over a plurality of physical storage devices. Forwarding an LBA (and optionally a length) as provided by the host as part of the request, preserves the LBA (and optional length) information. Preserving the LBA (and optional length) information and translating on a target device, enables maintaining accurate integrity metadata (such as DIV/DIX referential integrity) and/or enables independent (e.g. parallel) operation of devices.

In some embodiments and/or usage scenarios, the ganging/grouping enables transparent redundancy and/or recovery with respect to storage capabilities, such as various RAID, mirroring, and fail-over implementations. In various embodiments, host traffic is predominantly data traffic while peer-to-peer traffic is predominantly control traffic. In various embodiments, peer-to-peer traffic includes data (e.g. during a RAID recovery operation, or during transport of accumulated parity information).

In various embodiments and/or usage scenarios, the ganging/grouping enables systems with a host coupled to SSD(s) where bandwidths of one or more PCIe links coupled to the host (each having one or more lanes) are distributed (transparently to the host) across a plurality of SSDs, a plurality of flash controllers (such as used in SSDs), and/or a plurality of flash chips. For example, bandwidth of one host-coupled PCIe link (e.g. having eight lanes) is distributed across four SSDs or alternatively eight flash controllers (each SSD or flash controller having one PCIe link with, e.g., fewer than eight lanes). For another example, bandwidth of four host-coupled PCIe links is distributed across 64 SSDs or alternatively 256 flash controllers. For another example, bandwidth of one host-coupled PCIe link is distributed across 32 flash chips or alternatively across 64 flash chips. For another example, bandwidth of four host-coupled PCIe links is distributed across 128 flash chips or alternatively across 256 flash chips.

In various embodiments, a primary agent determines host to secondary agent storage mapping (e.g. which host LBA ranges correspond to which secondary agents). For example, host LBAs are striped across physical drives at a pre-determined size (e.g. 64 KB). For another example, host LBAs are striped according to a RAID implementation (e.g. RAID 0, RAID 1, or RAID 5). For yet another example, striping is changed dynamically according to workload (e.g. a first striping is used for a first workload and a second striping is used for a second workload).

In some embodiments, a group of PCIe storage devices (accessible from one or more hosts) are coupled via a bus topology enabling peer-to-peer communication with each other. The group of PCIe storage devices is configured so that only one PCIe device in the group receives requests for a particular host logical connection. In some embodiments, there is a plurality of connections to the group, enabling different host logical connections to supply requests that are received by different PCIe storage devices in the group.

Configuration of the group of PCIe storage devices depends on how the devices are exposed to the host(s). If all of the devices in the group are directly exposed to the host, e.g., via a transparent switch, then all devices but the ones enabling host logical connections report zero storage capacity back to the host(s), while the devices enabling host logical connections report a configured capacity of the group for a particular host logical connection. The configured capacity depends on how storage of the group is partitioned across host logical connections as well as how the storage is configured or organized (such as JBOD or RAID). If some of the devices are hidden from the host behind, e.g., a bridge or a non-transparent switch, then the zero capacity reporting is not performed by the devices not exposed to the host. A host logical connection only sends requests directly to a single PCIe device interface that then distributes and coordinates requests to the other devices in the group.

In further embodiments, two or more devices enabling respective host logical connections report storage capacity that is overlapped within storage capacities of the devices and/or other devices. For example, a first device enabling a first host logical connection reports an aggregate storage capacity equal to a total storage capacity of the first device and a total storage capacity of a second device. A third device enabling a second host logical connection reports the aggregate storage capacity as well. Host requests received via the first host logical connection or received via the second host logical connection reference same physical storage of the first device and of the second device (optionally and/or selectively using different LBAs).

Storage implemented by a storage device need not be entirely exposed (or not exposed) directly to a host. For example, a particular storage device implements storage that is partially allocated to a group of storage devices (e.g. not directly exposed to a host) and that is partially allocated for direct exposure to the host. The particular storage device, rather than reporting zero capacity to the host, instead reports an amount of storage corresponding to the partial allocation for direct exposure to the host.

In some embodiments, initial configuration of devices of the group is performed by software residing on the host(s) and/or in one or more option ROMs. An example of the initial configuration is which of the devices is to enable host logical connections and which are not. Another example of the initial configuration is how much storage to allocate to a group of devices versus for direct exposure to a host.

In some embodiments, configuration of devices of the group is performed while a system is operating, such as when a "hot spare" is inserted or when a device is added to or removed from the group dynamically, e.g. in response to a failure. For example, when a hot spare device is inserted, a discovery process involving one or more of a device driver on a host and a primary agent recognizes the inserted device, and configures the inserted device accordingly (such as to replace a failed device). The insertion of the device is indicated via, for instance, an announcement from the inserted device and/or a "hotplug" event.

When a host issues a storage read/write request (such as an eNVMHCI or AHCI-compliant request), the device receiving the request uses an LBA (and optionally length) of the request to forward the request to device(s) of the group that implement the storage requested. Depending on the length of the request and the organization of the group (e.g. JBOD or RAID), the request is routed to more than one device of the group, for example as a plurality of sub-requests.

According to various embodiments, when a particular device in the group receives a sub-request, the particular device translates the LBA (and optionally any supplied length) to a local LBA (and length), processes the sub-request, and then transfers data for the sub-request directly to/from host memory. An example of host memory is an element enabled to retain data written by the host via execution of an instruction that stores data to memory at a particular address and enabled for the host to read the written data via execution of an instruction that reads data from memory at the particular address. The particular device optionally and/or selectively obtains a host memory address of where to transfer the data from one or more of: (a) from the (forwarded) sub-request, (b) from host resident translation structures (such as scatter/gather lists), and (c) by issuing proxy requests to a device acting as a control interface to the host. In some embodiments, the issuing of proxy requests is only performed for IO virtualization.

When the data transfer for each sub-request is complete, the transferring device reports sub-status to the device acting as the control interface to the host. The device acting as the control interface to the host then posts status to the host when all of the devices involved in a request have reported sub-statuses.

Non-data commands (for example a SATA IDENTIFY DEVICE command) are processed similarly. When a non-data command is received by a particular device acting as a control interface to a host, the particular device interrogates the other devices in the group (if necessary), and then reports back summarized and/or aggregated results of the interrogation to the host.

In various embodiments, a host sees an aggregation of a plurality of devices (such as devices each having an x1 or x2 PCIe connection) as a single logical device encompassing storage of all the devices (e.g. the devices are virtualized as the single logical device). In various embodiments, the host sees any or all of the devices as having portions of overall storage, enabling splitting control traffic in addition to data traffic.

A request from the host via a submission queue (such as one submission queue of a plurality of simultaneously active submission queues for parallel streams of activity) is processed, e.g., by a particular one of the devices that the host is aware of. An individual request in the submission queue is optionally and/or selectively forwarded as a sub-request (via peer-to-peer requests from the particular device) to the devices that implement all or portions of storage referenced by the request. For example, the storage is striped among the devices by individual or groups of LBAs. In some embodiments and/or usage scenarios, striping in groups of LBAs enables performance benefits via aggregation of larger chunks to individual devices. In some embodiments having a plurality of submission queues, the host notifies a particular one of the devices of new submission queues, and the particular device distributes servicing of the new submission queues to others of the devices.

The individual devices process the forwarded sub-requests, including data transfer to/from the host, independently. Some protocols (such as some PCIe compatible protocols) use "completions" that are provided via a respective completion queue for each submission queue. For each entry in a submission queue, a corresponding completion notification is sent back to the respective completion queue. Any one or more of the devices are optionally and/or selectively enabled to "aggregate" completion information and update the completion queue for a given request. In various embodiments, one device is assigned per completion queue to enable atomicity. The assigned device is, in some embodiments, the same device that processes entries in the corresponding submission queue, while in other embodiments, the assigned device is different than the device that processes the entries in the corresponding submission queue.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system comprising:
  means for accepting a request from a host to access storage at an address;
  means for determining, based at least in part on the address, which one or more of a plurality of storage devices the request corresponds to;
  means for determining, based at least in part on the address, a respective sub-request corresponding to each of the determined storage devices;
  means for sending the sub-requests to the corresponding determined storage devices;
  means for accepting respective sub-status from each of the determined storage devices;
  means for determining an overall status based at least in part on each of the respective sub-statuses;
  means for providing the overall status to the host;
  wherein the means for accepting the request is compatible with a host-interface protocol and the means for sending the sub-requests and the means for accepting the sub-statuses are compatible with a peer-to-peer protocol operable independently of the host; and
  wherein at least one of the storage devices implements storage that is accessible via one of the sub-requests and the at least one of the storage devices disables accesses via the host-interface protocol to the implemented storage.

EC2) The system of EC1, wherein two or more of the means for accepting a request, the means for sending the sub-requests, the means for accepting respective sub-status, and the means for providing the overall status are operable on a shared physical interface.

EC3) The system of EC2, wherein at least one of a Peripheral Component Interconnect express (PCIe) topology and an Infiniband topology comprises the shared physical interface.

EC4) The system of EC2, wherein at least one of a Peripheral Component Interconnect express (PCIe) interface and an Infiniband interface comprises the shared physical interface.

EC5) The system of EC1 further comprising a particular one of the storage devices that comprises the means for accepting the request, the means for determining the storage devices, the means for determining the sub-requests, the means for sending the sub-requests, the means for accepting the sub-statuses, the means for determining the overall status, and the means for providing the overall status.

EC6) The system of EC1, wherein two or more of the storage devices are enabled to communicate with the host via the host interface protocol.

EC7) The system of EC6, wherein the two or more of the storage devices are all of the storage devices.

EC8) The system of EC1, wherein the address comprises a starting location and a length.

EC9) The system of EC1, wherein the address is a Logical Block Address (LBA).

EC10) The system of EC1, wherein the means are collectively implemented in a single Integrated Circuit (IC).

EC11) The system of EC1, wherein the means are collectively implemented in a single add-in card.

EC12) The system of EC1, wherein the means are comprised in a Solid-State Disk (SSD).

EC13) The system of EC1, wherein the host-interface protocol is compatible with one or more of
  a Universal Serial Bus (USB) interface standard,
  a Compact Flash (CF) interface standard,
  a MultiMediaCard (MMC) interface standard,
  a Secure Digital (SD) interface standard,
  a Memory Stick interface standard,
  an xD-picture card interface standard,
  an Integrated Drive Electronics (IDE) interface standard,
  a Serial Advanced Technology Attachment (SATA) interface standard,
  an external SATA (eSATA) interface standard,
  a Small Computer System Interface (SCSI) interface standard,
  a Serial Attached Small Computer System Interface (SAS) interface standard,
  a Fibre Channel interface standard,
  an Ethernet interface standard, and
  a Peripheral Component Interconnect express (PCIe) interface standard.

EC14) The system of EC1, further comprising all or any portions of the host.

EC15) The system of EC14, wherein the host comprises one or more of
  a computer,
  a workstation computer,
  a server computer,
  a storage server,
  a Personal Computer (PC),
  a laptop computer,
  a notebook computer,
  a netbook computer,
  a Personal Digital Assistant (PDA),
  a media player,
  a media recorder,
  a digital camera,
  a cellular handset,
  a cordless telephone handset, and
  an electronic game.

EC16) The system of EC1, further comprising all or any portions of the storage devices.

EC17) The system of EC1, further comprising flash memory comprised in one or more of the storage devices.

EC18) A computer readable medium having a set of instructions stored therein that when executed by a processing element cause the processing element to perform operations comprising:
  managing accepting a request from a host to access storage at an address;
  managing determining, based at least in part on the address, which one or more of a plurality of storage devices the request corresponds to;
  managing determining, based at least in part on the address, a respective sub-request corresponding to each of the determined storage devices;
  managing sending the sub-requests to the corresponding determined storage devices;
  managing accepting respective sub-status from each of the determined storage devices;
  managing determining an overall status based at least in part on each of the respective sub-statuses;
  managing providing the overall status to the host;
  wherein the accepting the request is via a host-interface protocol and the sending the sub-requests and the accepting the sub-statuses are via a peer-to-peer protocol operable independently of the host; and
  wherein at least one of the storage devices implements storage that is accessible via one of the sub-requests and the at least one of the storage devices disables accesses via the host-interface protocol to the implemented storage.

EC19) The computer readable medium of EC18, wherein the host-interface and the peer-to-peer protocols are compatible with a Peripheral Component Interconnect express (PCIe) channel.

EC20) A method comprising:
  accepting a request from a host to access storage at an address;
  determining, based at least in part on the address, which one or more of a plurality of storage devices the request corresponds to;
  determining, based at least in part on the address, a respective sub-request corresponding to each of the determined storage devices;
  sending the sub-requests to the corresponding determined storage devices;
  accepting respective sub-status from each of the determined storage devices;
  determining an overall status based at least in part on each of the respective sub-statuses;
  providing the overall status to the host;
  wherein the accepting the request is compatible with a host-interface protocol and the sending the sub-requests and the accepting the sub-statuses are compatible with a peer-to-peer protocol operable independently of the host; and
  wherein at least one of the storage devices implements storage that is accessible via one of the sub-requests and the at least one of the storage devices disables accesses via the host-interface protocol to the implemented storage.

EC21) A system comprising:

host interface logic hardware enabled to accept a request from a host to access storage at an address;

control logic hardware enabled to determine, based at least in part on the address, which one or more of a plurality of storage devices the request corresponds to and a respective sub-request corresponding to each of the determined storage devices, to send the sub-requests to the corresponding determined storage devices, to accept respective sub-status from each of the determined storage devices, and to determine an overall status based at least in part on each of the respective sub-statuses;

wherein the host interface logic hardware is further enabled to provide the overall status to the host;

wherein the accepting the request is compatible with a host-interface protocol and the sending the sub-requests and the accepting the sub-statuses are compatible with a peer-to-peer protocol operable independently of the host; and wherein at least one of the storage devices implements storage that is accessible via one of the sub-requests and the at least one of the storage devices disables accesses via the host-interface protocol to the implemented storage.

EC22) A method comprising:

a first storage device reading a first request from a first one of a plurality of host request queues;

a second storage device reading a second request from a second one of the host request queues, the second host request queue being distinct from the first host request queue, the reading by the second storage device being independent of the reading by the first storage device;

the first storage device forwarding at least a portion of the first request to the second storage device;

the second storage device forwarding at least a portion of the second request to the first storage device, the forwarding by the second storage device being independent of the forwarding by the first storage device;

the first storage device accessing first storage of the first storage device in accordance with the at least the portion of the second request and sending a first sub-status, based at least in part on the accessing by the first storage device, to the second storage device; and the second storage device accessing second storage of the second storage device in accordance with the at least the portion of the first request and sending a second sub-status, based at least in part on the accessing by the second storage device, to the first storage device.

EC23) A system comprising:

means for a first storage device to read a first request from a first one of a plurality of host request queues;

means for a second storage device to read a second request from a second one of the host request queues, the second host request queue being distinct from the first host request queue, the reading by the second storage device being independent of the reading by the first storage device;

means for the first storage device to forward at least a portion of the first request to the second storage device;

means for the second storage device to forward at least a portion of the second request to the first storage device, the forwarding by the second storage device being independent of the forwarding by the first storage device;

means for the first storage device to access first storage of the first storage device in accordance with the at least the portion of the second request and to send a first sub-status, based at least in part on the accessing by the first storage device, to the second storage device; and means for the second storage device to access second storage of the second storage device in accordance with the at least the portion of the first request and to send a second sub-status, based at least in part on the accessing by the second storage device, to the first storage device.

EC24) A system comprising:

host interface logic hardware of a first storage device enabled to read a first request from a first one of a plurality of host request queues;

host interface logic hardware of a second storage device enabled to read a second request from a second one of the host request queues, the second host request queue being distinct from the first host request queue, the reading by the second storage device being independent of the reading by the first storage device;

request forwarding logic hardware of the first storage device enabled to forward at least a portion of the first request to the second storage device;

request forwarding logic hardware of the second storage device enabled to forward at least a portion of the second request to the first storage device, the forwarding by the second storage device being independent of the forwarding by the first storage device;

storage interface logic hardware of the first storage device enabled to access first storage of the first storage device in accordance with the at least the portion of the second request;

sub-status generation logic hardware of the first storage device enabled to determine a first sub-status, based at least in part on the accessing by the first storage device;

sub-status forwarding logic hardware of the first storage device enabled to forward the first sub-status to the second storage device;

storage interface logic hardware of the second storage device enabled to access second storage of the second storage device in accordance with the at least the portion of the first request;

sub-status generation logic hardware of the second storage device enabled to determine a second sub-status, based at least in part on the accessing by the second storage device; and sub-status forwarding logic hardware of the second storage device enabled to forward the second sub-status to the first storage device.

EC25) A method comprising:

a first storage device reading a first request from a first one of a plurality of host request queues;

a second storage device reading a second request from a second one of the host request queues, the second host request queue being distinct from the first host request queue, the reading by the second storage device being independent of the reading by the first storage device;

the first storage device forwarding at least a portion of the first request to the second storage device;

the second storage device forwarding at least a portion of the second request to the first storage device, the forwarding by the second storage device being independent of the forwarding by the first storage device;

the first storage device accessing first storage in accordance with the at least the portion of the second request and writing a first status, based at least in part on the accessing by the first storage device, to a first one of a plurality of host status queues; and the second storage device accessing second storage in accordance with the at least the portion of the first request and writing a second status, based at least in part on the accessing by the second storage device, to a second one of the host status queues, the accessing by the second storage device being independent of the accessing by the first storage device, the second storage being distinct from the first storage.

EC26) A system comprising:

means for a first storage device to read a first request from a first one of a plurality of host request queues;

means for a second storage device to read a second request from a second one of the host request queues, the second host request queue being distinct from the first host request queue, the reading by the second storage device being independent of the reading by the first storage device;

means for the first storage device to forward at least a portion of the first request to the second storage device;

means for the second storage device to forward at least a portion of the second request to the first storage device, the forwarding by the second storage device being independent of the forwarding by the first storage device;

means for the first storage device to access first storage in accordance with the at least the portion of the second request and to write a first status, based at least in part on the accessing by the first storage device, to a first one of a plurality of host status queues; and means for the second storage device to access second storage in accordance with the at least the portion of the first request and to write a second status, based at least in part on the accessing by the second storage device, to a second one of the host status queues, the accessing by the second storage device being independent of the accessing by the first storage device, the second storage being distinct from the first storage.

EC27) A system comprising:

host interface logic hardware of a first storage device enabled to read a first request from a first one of a plurality of host request queues;

host interface logic hardware of a second storage device enabled to read a second request from a second one of the host request queues, the second host request queue being distinct from the first host request queue, the reading by the second storage device being independent of the reading by the first storage device;

request forwarding logic hardware of the first storage device enabled to forward at least a portion of the first request to the second storage device;

request forwarding logic hardware of the second storage device enabled to forward at least a portion of the second request to the first storage device, the forwarding by the second storage device being independent of the forwarding by the first storage device;

storage interface logic hardware of the first storage device enabled to access first storage in accordance with the at least the portion of the second request;

status generation logic hardware of the first storage device enabled to determine a first status, based at least in part on the accessing by the first storage device, and further enabled to provide the first status to the host interface logic hardware of the first storage device to be written to a first one of a plurality of host status queues;

storage interface logic hardware of the second storage device enabled to access second storage in accordance with the at least the portion of the first request; and status generation logic hardware of the second storage device enabled to determine a second status, based at least in part on the accessing by the second storage device, and further enabled to provide the second status to the host interface logic hardware of the second storage device to be written to a second one of the host status queues, the accessing by the second storage device being independent of the accessing by the first storage device, the second storage being distinct from the first storage.

EC28) A system comprising:

means for enabling a host to access, as a single logical interface, an aggregation of a plurality of storage ranges distributed over a plurality of physical storage devices, one of the physical storage devices enabled to operate as a primary agent and one or more of the physical storage devices enabled to operate as secondary agents;

means for communicating peer-to-peer traffic between the primary agent and at least one of the secondary agents;

wherein the primary agent is enabled to manage at least a portion of the secondary agents for redundant data storage; and wherein the peer-to-peer traffic comprises redundancy traffic to implement the redundant data storage.

EC29) The system of EC28, wherein at least a portion of the redundancy traffic comprises accumulated parity information.

EC30) The system of EC29, wherein the at least the portion is forwarded from the primary agent and/or one of the secondary agents.

EC31) The system of EC29, wherein the at least the portion is forwarded to a one of the secondary agents that implements accumulated parity storage corresponding to the accumulated parity information.

EC32) The system of EC28, wherein at least a portion of the redundancy traffic is provided by the primary agent to one or more of the secondary agents.

EC33) The system of EC28, wherein at least a portion of the redundancy traffic is provided by one or more of the secondary agents to the primary agent.

EC34) The system of EC28, wherein at least a portion of the redundancy traffic is between a plurality of the secondary agents.

EC35) The system of EC28, wherein the redundancy traffic comprises one or more of control information, untransformed data, and transformed data.

EC36) The system of EC35, wherein the control information comprises an indication of how many redundancy updates are to occur for a particular storage address.

EC37) The system of EC36, wherein at least one of the primary agent and the secondary agents is enabled to use the indication to cache information relating to the redundancy updates until the redundancy updates have occurred for the particular storage address.

EC38) The system of EC35, wherein the untransformed data comprises one or more portions of write data from the host.

EC39) The system of EC38, wherein the portions of write data are determined based at least in part on a mirroring operation.

EC40) The system of EC35, wherein the transformed data comprises one or more of parity data based at least in part on write data from the host,
exclusive-or (XOR) data based at least in part on write data from the host, and redundancy information based at least in part on a Redundant Array of Inexpensive/Independent Disks (RAID) implementation.

EC41) The system of EC28, wherein the redundancy traffic comprises Read-Modify-Write (RMW) operation control and/or data redundancy traffic.

EC42) The system of EC41, wherein the RMW operation data redundancy traffic is a copy of all or any portions of write data from the host.

EC43) The system of EC41, wherein the RMW operation data redundancy traffic is transformed data based at least in part on a portion of write data from the host.

EC44) The system of EC41, wherein the RMW operation control redundancy traffic is an indication of how many redundancy updates are to occur for a particular address.

EC45) The system of EC28, wherein the redundancy traffic comprises data recovery operation control and/or data redundancy traffic.

EC46) The system of EC28, wherein the redundant data storage is in accordance with one or more Redundant Array of Inexpensive/Independent Disks (RAID) techniques.

EC47) The system of EC28, wherein the primary agent is enabled to accept a request from the host to access storage, to forward the request as one or more sub-requests to all or any portions of the secondary agents, and to accept sub-statuses associated with the sub-requests from the secondary agents that the sub-requests were forwarded to.

EC48) The system of EC47, wherein the sub-requests are determined at least in part based on a redundancy technique that the redundant data storage is in accordance with.

EC49) The system of EC48, wherein the redundancy technique is according to a Redundant Array of Inexpensive/Independent Disks (RAID) implementation.

EC50) The system of EC47, wherein at least a portion of the sub-requests are based in part on a striping across the physical devices the sub-requests are forwarded to.

EC51) The system of EC50, wherein the striping is according to a Redundant Array of Inexpensive/Independent Disks (RAID) implementation.

EC52) The system of EC50, wherein the striping is changed dynamically according to workload.

EC53) The system of EC28, wherein each of the secondary agents is enabled to accept one or more sub-requests from the primary agent, translate host-context addressing information of the accepted sub-requests to access local storage and to provide respective sub-statuses to the primary agent based at least in part on the local accessing.

EC54) The system of EC28, wherein each of the secondary agents is enabled to accept one or more sub-requests from the primary agent, translate host-context addressing information of the accepted sub-requests to access local storage, access the local storage, and transfer data with the host, the data being read/write data of the access.

EC55) The system of EC28, further comprising means for communicating host traffic between the host and the primary agent.

EC56) The system of EC55, wherein the means for communicating peer-to-peer traffic is via at least one logical channel that is distinct from logical channels of the means for communicating host traffic.

EC57) The system of EC55, wherein the means for communicating peer-to-peer traffic is via at least one physical channel that is distinct from physical channels of the means for communicating host traffic.

EC58) The system of EC55, wherein one or more of the means for communicating peer-to-peer traffic and the means for communicating host traffic are compatible with a Peripheral Component Interconnect express (PCIe) standard.

EC59) The system of EC55, wherein one or more of the means for communicating peer-to-peer traffic and the means for communicating host traffic are compatible with an Infiniband standard.

EC60) The system of EC55, wherein the means for communicating peer-to-peer traffic comprises all or any portions of a non-transparent switch.

EC61) The system of EC55, wherein the means for communicating host traffic comprises all or any portions of a transparent switch.

EC62) A method comprising:
enabling a host to access, as a single logical interface, an aggregation of a plurality of storage ranges distributed over a plurality of physical storage devices, one of the physical storage devices enabled to operate as a primary agent and one or more of the physical storage devices enabled to operate as secondary agents;
communicating peer-to-peer traffic between the primary agent and at least one of the secondary agents;
wherein the primary agent is enabled to manage at least a portion of the secondary agents for redundant data storage; and
wherein the peer-to-peer traffic comprises redundancy traffic to implement the redundant data storage.

EC63) A system comprising:
host interface logic hardware;
a plurality of physical storage devices enabled to selectively communicate with a host at least in part via the host interface logic hardware, at least one of the physical storage devices enabled to operate as a primary agent and one or more of the physical storage devices enabled to operate as respective secondary agents,
peer-to-peer communication logic hardware enabling peer-to-peer traffic between the primary agent and at least one of the secondary agents;
wherein the physical storage devices implement an aggregation of a plurality of storage ranges distributed over the physical storage devices;
wherein the primary agent is enabled to manage at least a portion of the secondary agents to implement redundant data storage; and
wherein the peer-to-peer traffic comprises redundancy traffic to implement the redundant data storage.

EC64) A system comprising:
means for interfacing between a plurality of storage agents via a peer-to-peer protocol;
means for detecting a failure of a failed one of the storage agents, the failure being the failed storage agent no longer implementing a particular portion of storage; and
means for allocating storage subject to reallocation to implement the particular portion of storage, the storage subject to reallocation comprising any combination of storage implemented by non-failed ones of the storage agents.

EC65) The system of EC64, wherein the storage agents comprise secondary agents.

EC66) The system of EC64, wherein the storage agents comprise primary agents.

EC67) The system of EC64, wherein the means are comprised in a primary agent, and the storage agents comprise secondary agents.

EC68) The system of EC64, wherein each of the storage agents implements at least a respective portion of physical storage.

EC69) The system of EC68, wherein the respective portions comprise one or more non-volatile memories.

EC70) The system of EC64, further comprising local storage and wherein the storage subject to allocation further comprises the local storage.

EC71) The system of EC64, wherein the failure is a partial failure, and the failed storage agent continues to implement at least some storage after the partial failure.

EC72) The system of EC71, wherein the storage subject to allocation further comprises the at least some storage.

EC73) The system of EC64, wherein the means for detecting is implemented at least in part via one of the storage agents.

EC74) The system of EC64, wherein the means for detecting is implemented at least in part via a device driver.

EC75) The system of EC64, further comprising means for recovering data via one or more redundancy techniques.

EC76) The system of EC75, wherein the redundancy techniques comprise a mirroring technique.

EC77) The system of EC75, wherein the redundancy techniques comprise a Redundant Array of Inexpensive/Independent Disks (RAID) technique.

EC78) A method comprising:
  interfacing between a plurality of storage agents via a peer-to-peer protocol;
  detecting a failure of a failed one of the storage agents, the failure being the failed storage agent no longer implementing a particular portion of storage; and
  allocating storage subject to reallocation to implement the particular portion of storage, the storage subject to reallocation comprising any combination of storage implemented by non-failed ones of the storage agents.

EC79) A system comprising:
  peer-to-peer communication logic hardware enabling peer-to-peer protocol communication between a plurality of storage agents;
  failure detection logic hardware enabled to detect a failure of a failed one of the storage agents, the failure being the failed storage agent no longer implementing a particular portion of storage; and
  a processor enabled to execute instructions that when executed by the processor cause the processor to perform operations comprising allocating storage subject to reallocation to implement the particular portion of storage, the storage subject to reallocation comprising any combination of storage implemented by non-failed ones of the storage agents.

EC80) A computer readable medium having a set of instructions stored therein that when executed by a processing element cause the processing element to perform operations comprising:
  managing interfacing between a plurality of storage agents via a peer-to-peer protocol;
  managing detecting a failure of a failed one of the storage agents, the failure being the failed storage agent no longer implementing a particular portion of storage; and
  managing allocating storage subject to reallocation to implement the particular portion of storage, the storage subject to reallocation comprising any combination of storage implemented by non-failed ones of the storage agents.

EC81) A system comprising:
  means for detecting a failure of a failed one of a plurality of storage agents, the failure being the failed storage agent no longer enabling a host to access, as a single logical interface, an aggregation of a plurality of storage ranges distributed over the storage agents;
  means for identifying a replacement storage agent to replace the failed storage agent; and
  means for configuring the replacement storage agent to provide the single logical interface.

EC82) The system of EC81, wherein the replacement storage agent is a hot spare.

EC83) The system of EC81, wherein the replacement storage agent is one of the storage agents other than the failed storage agent.

EC84) The system of EC83, wherein the replacement storage agent is a primary agent.

EC85) The system of EC83, wherein the replacement storage agent is a configurable agent that is selectively operable as a primary agent or a secondary agent.

EC86) The system of EC81, wherein the means for detecting is implemented at least in part via one of the storage agents.

EC87) The system of EC81, wherein the means for detecting is implemented at least in part via a device driver executing on the host.

EC88) The system of EC81, further comprising means for interfacing to the host via a host interface protocol that comprises reading a storage request from an entry in a submission queue, the means for interfacing being in accordance with the providing the single logical interface.

EC89) The system of EC88, further comprising means for determining one or more storage sub-requests based at least in part on address information of the storage request.

EC90) The system of EC89, further comprising means for forwarding the sub-requests to secondary ones of the storage agents.

EC91) The system of EC90, further comprising means for receiving sub-status information corresponding respectively to the sub-requests and returning overall status to the host based at least in part on the received sub-status information.

EC92) The system of EC81, further comprising means for communicating peer-to-peer traffic among the storage agents.

EC93) A method comprising:
  detecting a failure of a failed one of a plurality of storage agents, the failure being the failed storage agent no longer enabling a host to access, as a single logical interface, an aggregation of a plurality of storage ranges distributed over the storage agents;
  identifying a replacement storage agent to replace the failed storage agent; and configuring the replacement storage agent to provide the single logical interface.

EC94) A system comprising:
  failure detection logic hardware enabled to detect a failure of a failed one of a plurality of storage agents, the failure being the failed storage agent no longer enabling a host to access, as a single logical interface, an aggregation of a plurality of storage ranges distributed over the storage agents; and
  a processor enabled to execute instructions that when executed by the processor cause the processor to perform operations comprising
    identifying a replacement storage agent to replace the failed storage agent, and
    configuring the replacement storage agent to provide the single logical interface.

EC95) A computer readable medium having a set of instructions stored therein that when executed by a processing element cause the processing element to perform operations comprising:
  managing detecting a failure of a failed one of a plurality of storage agents, the failure being the failed storage agent no longer enabling a host to access, as a single logical interface, an aggregation of a plurality of storage ranges distributed over the storage agents;

managing identifying a replacement storage agent to replace the failed storage agent; and managing configuring the replacement storage agent to provide the single logical interface.

EC96) A system comprising:

storage interface means for interfacing to mass storage;

host interface means for interfacing to a host via a host-interface protocol, the host interface means comprising means for reading a storage request from an entry in a submission queue;

primary agent interface means for interfacing to a primary agent via a peer-to-peer protocol;

address determination means for determining at least one address to access the mass storage via the storage interface means, the means for determining operable based at least in part on address information comprised in the storage request;

storage capacity reporting means for reporting back to the host a zero storage capacity, and further for reporting back to the primary agent a storage capacity in accordance with a storage capacity of the mass storage; and wherein the host interface means and the primary agent interface means are implemented at least in part via a same physical channel.

EC97) The system of EC96, further comprising destination determination means for determining, based at least in part on the address information, at least one destination to forward accumulated parity data to.

EC98) The system of EC97, wherein the at least one destination is reachable via the peer-to-peer protocol.

EC99) The system of EC98, wherein the at least one destination is the primary agent.

EC100) The system of EC98, wherein the at least one destination is a secondary agent.

EC101) The system of EC96, wherein the address determination means operates in accordance with one or more redundancy techniques.

EC102) The system of EC101, wherein the redundancy techniques comprise one or more mirroring techniques and/or one or more Redundant Array of Inexpensive/Independent Disks (RAID) techniques.

EC103) The system of EC96, wherein the host interface means further comprises means for transferring data between the host and the mass storage.

EC104) The system of EC96, wherein the same physical channel is compatible with a Peripheral Component Interconnect express (PCIe) standard.

EC105) The system of EC96, wherein the same physical channel is compatible with an Infiniband standard.

EC106) The system of EC96, wherein the mass storage comprises one or more non-volatile memories.

EC107) A method comprising:

interfacing to mass storage;

interfacing to a host via a host-interface protocol, the interfacing to the host comprising reading a storage request from an entry in a submission queue;

interfacing to a primary agent via a peer-to-peer protocol;

determining at least one address to access the mass storage via the interfacing to mass storage, the determining operable based at least in part on address information comprised in the storage request;

reporting back to the host a zero storage capacity, and reporting back to the primary agent a storage capacity in accordance with a storage capacity of the mass storage; and wherein the interfacing to the host and the interfacing to the primary agent are implemented at least in part via a same physical channel.

EC108) A system comprising:

a mass storage hardware interface enabled to interface with mass storage;

host interface logic hardware enabling interfacing with the host, compatible with a host-interface protocol, and enabled to read a storage request from an entry in a submission queue;

peer-to-peer communication logic hardware enabling interfacing with a primary agent via a peer-to-peer protocol;

access address determination logic hardware enabled to determine at least one address to access the mass storage via the mass storage hardware interface, the determining operable based at least in part on address information comprised in the storage request;

storage capacity reporting logic hardware enabled to report back to the host a zero storage capacity, and further enabled to report back to the primary agent a storage capacity in accordance with a storage capacity of the mass storage; and wherein the interfacing with the host and the interfacing with the primary agent are implemented at least in part via a same physical channel.

EC109) A computer readable medium having a set of instructions stored therein that when executed by a processing element cause the processing element to perform operations comprising:

managing interfacing to mass storage;

managing interfacing to a host via a host-interface protocol, the interfacing to the host comprising reading a storage request from an entry in a submission queue;

managing interfacing to a primary agent via a peer-to-peer protocol;

managing determining at least one address to access the mass storage via the interfacing to mass storage, the determining operable based at least in part on address information comprised in the storage request;

managing reporting back to the host a zero storage capacity, and reporting back to the primary agent a storage capacity in accordance with a storage capacity of the mass storage; and wherein the interfacing to the host and the interfacing to the primary agent are implemented at least in part via a same physical channel.

EC110) A system comprising:

storage interface means for interfacing to mass storage;

host interface means for interfacing to a host via a host-interface protocol, the host interface means comprising means for transferring data between the host and the mass storage;

primary agent interface means for interfacing to a primary agent via a peer-to-peer protocol, the primary agent interface means comprising means for receiving a forwarded storage request from the primary agent;

address determination means for determining at least one address to access the mass storage, the means for determining operable based at least in part on address information comprised in the forwarded storage request;

wherein the forwarded storage request corresponds to a request obtained from a submission queue, the request and the forwarded request referring to identical one or more address ranges; and wherein the host interface means and the primary agent interface means are implemented at least in part via a same physical channel.

EC111) The system of EC110, further comprising destination determination means for determining, based at least in part on the address information, at least one destination to forward accumulated parity data to.

EC112) The system of EC111, wherein the at least one destination is reachable via the peer-to-peer protocol.

EC113) The system of EC112, wherein the at least one destination is the primary agent.

EC114) The system of EC112, wherein the at least one destination is a secondary agent.

EC115) The system of EC110, wherein the address determination means operates in accordance with one or more redundancy techniques.

EC116) The system of EC115, wherein the redundancy techniques comprise one or more mirroring techniques and/or one or more Redundant Array of Inexpensive/Independent Disks (RAID) techniques.

EC117) The system of EC110, further comprising storage capacity reporting means for reporting back to the host a zero storage capacity, and further for reporting back to the primary agent a storage capacity in accordance with a storage capacity of the mass storage.

EC118) The system of EC110, wherein the same physical channel is compatible with a Peripheral Component Interconnect express (PCIe) standard.

EC119) The system of EC110, wherein the same physical channel is compatible with an Infiniband standard.

EC120) The system of EC110, wherein the mass storage comprises one or more non-volatile memories.

EC121) A method comprising:
interfacing to mass storage;
interfacing to a host via a host-interface protocol, the interfacing to the host comprising transferring data between the host and the mass storage;
interfacing to a primary agent via a peer-to-peer protocol, the interfacing to the primary agent comprising receiving a forwarded storage request from the primary agent;
determining at least one address to access the mass storage via the interfacing to mass storage, the determining operable based at least in part on address information comprised in the storage request;
wherein the forwarded storage request corresponds to a request obtained from a submission queue, the request and the forwarded request referring to identical one or more address ranges; and
wherein the interfacing to the host and the interfacing to the primary agent are implemented at least in part via a same physical channel.

EC122) A system comprising:
a mass storage hardware interface enabled to interface with mass storage;
host interface logic hardware enabling interfacing with the host, compatible with a host-interface protocol, and enabled to transfer data between the host and the mass storage at least in part via the mass storage hardware interface;
peer-to-peer communication logic hardware enabling interfacing with a primary agent via a peer-to-peer protocol;
storage request accepting logic hardware enabling receiving a forwarded storage request from the primary agent at least in part via the peer-to-peer communication logic hardware;
access address determination logic hardware enabled to determine at least one address to access the mass storage via the mass storage hardware interface, the determining operable based at least in part on address information comprised in the storage request;
wherein the forwarded storage request corresponds to a request obtained from a submission queue, the request and the forwarded request referring to identical one or more address ranges; and
wherein the interfacing with the host and the interfacing with the primary agent are implemented at least in part via a same physical channel.

EC123) A computer readable medium having a set of instructions stored therein that when executed by a processing element cause the processing element to perform operations comprising:
managing interfacing to mass storage;
managing interfacing to a host via a host-interface protocol, the interfacing to the host comprising transferring data between the host and the mass storage;
managing interfacing to a primary agent via a peer-to-peer protocol, the interfacing to the primary agent comprising receiving a forwarded storage request from the primary agent;
managing determining at least one address to access the mass storage via the interfacing to mass storage, the determining operable based at least in part on address information comprised in the storage request;
wherein the forwarded storage request corresponds to a request obtained from a submission queue, the request and the forwarded request referring to identical one or more address ranges; and
wherein the interfacing to the host and the interfacing to the primary agent are implemented at least in part via a same physical channel.

EC124) A system comprising:
host interface means for interfacing to a host via a host-interface protocol, the host interface means comprising means for reading a storage request from an entry in a submission queue;
secondary agent interface means for interfacing to a secondary agent via a peer-to-peer protocol, the secondary agent interface means comprising means for forwarding a storage sub-request to the secondary agent;
sub-request generation means for determining the sub-request based at least in part on address information comprised in the storage request;
storage capacity reporting means for reporting back to the host a total storage capacity, the total storage capacity based at least in part on a storage capacity of the secondary agent; and
wherein the host interface means and the secondary agent interface means are implemented at least in part via a same physical channel.

EC125) The system of EC124, further comprising storage interface means for interfacing to mass storage.

EC126) The system of EC125, wherein the mass storage comprises one or more non-volatile memories.

EC127) A method comprising:
interfacing with a host via a host-interface protocol, the host interfacing comprising reading a storage request from an entry in a submission queue;
interfacing with a secondary agent via a peer-to-peer protocol, the secondary agent interfacing comprising forwarding a storage sub-request to the secondary agent;
determining the sub-request based at least in part on address information comprised in the storage request;

reporting back to the host a total storage capacity, the total storage capacity based at least in part on a storage capacity of the secondary agent; and wherein the interfacing with the host and the interfacing with the secondary agent are implemented at least in part via a same physical channel.

EC128) A system comprising:

host interface logic hardware enabling interfacing with the host, compatible with a host-interface protocol, and enabled to read a storage request from an entry in a submission queue;

peer-to-peer communication logic hardware enabling interfacing with a secondary agent via a peer-to-peer protocol;

request forwarding logic hardware enabled to forward a storage sub-request to the secondary agent at least in part via the peer-to-peer communication logic hardware;

sub-request determining logic hardware enabled to determine the sub-request based at least in part on address information comprised in the storage request;

storage capacity reporting logic hardware enabled to report back to the host a total storage capacity, the total storage capacity based at least in part on a storage capacity of the secondary agent; and wherein the interfacing with the host and the interfacing with the secondary agent are implemented at least in part via a same physical channel.

EC129) A computer readable medium having a set of instructions stored therein that when executed by a processing element cause the processing element to perform operations comprising:

managing interfacing with a host via a host-interface protocol, the host interfacing comprising reading a storage request from an entry in a submission queue;

managing interfacing with a secondary agent via a peer-to-peer protocol, the secondary agent interfacing comprising forwarding a storage sub-request to the secondary agent;

managing determining the sub-request based at least in part on address information comprised in the storage request;

managing reporting back to the host a total storage capacity, the total storage capacity based at least in part on a storage capacity of the secondary agent; and wherein the interfacing with the host and the interfacing with the secondary agent are implemented at least in part via a same physical channel.

EC130) A system comprising:

storage interface means for interfacing to mass storage;

host interface means for interfacing to a host via a host-interface protocol, the host interface means comprising means for transferring data between the host and the mass storage;

primary agent interface means for interfacing to a primary agent via a peer-to-peer protocol, the primary agent interface means comprising means for receiving a forwarded storage sub-request from the primary agent;

storage capacity reporting means for reporting back to the host a zero storage capacity, and further for reporting back to the primary agent a storage capacity in accordance with a storage capacity of the mass storage; and wherein the host interface means and the primary agent interface means are implemented at least in part via a same physical channel.

EC131) The system of EC130, wherein the mass storage comprises one or more non-volatile memories.

EC132) A method comprising:

interfacing to mass storage;

interfacing with a host via a host-interface protocol, the host interfacing comprising transferring data between the host and the mass storage;

interfacing with a primary agent via a peer-to-peer protocol, the primary agent interfacing comprising receiving a forwarded storage sub-request from the primary agent;

reporting back to the host a zero storage capacity, and further reporting back to the primary agent a storage capacity in accordance with a storage capacity of the mass storage; and wherein the interfacing with the host and the interfacing with the primary agent are implemented at least in part via a same physical channel.

EC133) A system comprising:

a mass storage hardware interface enabled to interface with mass storage;

host interface logic hardware enabling interfacing with the host, compatible with a host-interface protocol, and enabled to transfer data between the host and the mass storage at least in part via the mass storage hardware interface;

peer-to-peer communication logic hardware enabling interfacing with a primary agent via a peer-to-peer protocol;

sub-request receiving logic hardware enabled to receive a forwarded storage sub-request from the primary agent at least in part via the peer-to-peer communication logic hardware;

storage capacity reporting logic hardware enabled to report back to the host a zero storage capacity, and further enabled to report back to the primary agent a storage capacity in accordance with a storage capacity of the mass storage; and wherein the interfacing with the host and the interfacing with the primary agent are implemented at least in part via a same physical channel.

EC134) A computer readable medium having a set of instructions stored therein that when executed by a processing element cause the processing element to perform operations comprising:

managing interfacing to mass storage;

managing interfacing with a host via a host-interface protocol, the host interfacing comprising transferring data between the host and the mass storage;

managing interfacing with a primary agent via a peer-to-peer protocol, the primary agent interfacing comprising receiving a forwarded storage sub-request from the primary agent;

managing reporting back to the host a zero storage capacity, and further reporting back to the primary agent a storage capacity in accordance with a storage capacity of the mass storage; and wherein the interfacing with the host and the interfacing with the primary agent are implemented at least in part via a same physical channel.

EC135) A system comprising:

storage interface means for interfacing to mass storage;

host interface means for interfacing to a host via a host-interface protocol, the host interface means comprising means for transferring data between the host and the mass storage;

primary agent interface means for interfacing to a primary agent via a peer-to-peer protocol, the primary agent interface means comprising means for receiving a sub-request from the primary agent and means for sending a sub-status to the primary agent, the sub-status based at least in part on results of accessing the mass storage in accordance with the sub-request;

storage capacity reporting means for reporting back to the host a zero storage capacity, and further for reporting back to the primary agent a storage capacity in accordance with a storage capacity of the mass storage; and wherein the host interface means and the primary agent interface means are implemented at least in part via a same physical channel.

EC136) The system of EC135, wherein the primary agent interface means further comprises means for communicating redundancy information with the primary agent.

EC137) The system of EC136, wherein the redundancy information is compatible with one or more mirroring techniques and/or one or more Redundant Array of Inexpensive/Independent Disks (RAID) techniques.

EC138) The system of EC135, wherein the same physical channel is compatible with a Peripheral Component Interconnect express (PCIe) standard.

EC139) The system of EC135, wherein the same physical channel is compatible with an Infiniband standard.

EC140) The system of EC135, wherein the mass storage comprises one or more non-volatile memories.

EC141) A method comprising:
interfacing to mass storage;
interfacing with a host via a host-interface protocol, the interfacing with the host comprising transferring data between the host and the mass storage;
interfacing with a primary agent via a peer-to-peer protocol, the interfacing with the primary agent comprising receiving a sub-request from the primary agent and sending a sub-status to the primary agent, the sub-status based at least in part on results of accessing the mass storage in accordance with the sub-request;
reporting back to the host a zero storage capacity, and further reporting back to the primary agent a storage capacity in accordance with a storage capacity of the mass storage; and
wherein the interfacing with the host and the interfacing with the primary agent are implemented at least in part via a same physical channel.

EC142) A system comprising:
a mass storage hardware interface enabled to interface with mass storage;
host interface logic hardware enabling interfacing with the host, compatible with a host-interface protocol, and enabled to transfer data between the host and the mass storage at least in part via the mass storage hardware interface;
peer-to-peer communication logic hardware enabling interfacing with a primary agent via a peer-to-peer protocol;
sub-request receiving logic hardware enabled to receive a forwarded storage sub-request from the primary agent at least in part via the peer-to-peer communication logic hardware;
sub-status determination logic hardware enabled to determine a sub-status, based at least in part on accessing the mass storage in accordance with the sub-request and via the mass storage hardware interface;
sub-status forwarding logic hardware enabled to forward the sub-status to the primary agent at least in part via the peer-to-peer communication logic hardware; storage capacity reporting logic hardware enabled to report back to the host a zero storage capacity, and further enabled to report back to the primary agent a storage capacity in accordance with a storage capacity of the mass storage; and wherein the interfacing with the host and the interfacing with the primary agent are implemented at least in part via a same physical channel.

EC143) A computer readable medium having a set of instructions stored therein that when executed by a processing element cause the processing element to perform operations comprising:
managing interfacing to mass storage;
managing interfacing with a host via a host-interface protocol, the interfacing with the host comprising transferring data between the host and the mass storage;
managing interfacing with a primary agent via a peer-to-peer protocol, the interfacing with the primary agent comprising receiving a sub-request from the primary agent and sending a sub-status to the primary agent, the sub-status based at least in part on results of accessing the mass storage in accordance with the sub-request;
managing reporting back to the host a zero storage capacity, and further managing reporting back to the primary agent a storage capacity in accordance with a storage capacity of the mass storage; and
wherein the interfacing with the host and the interfacing with the primary agent are implemented at least in part via a same physical channel.

EC144) A method comprising:
accepting a request from a host to access storage at an address;
determining, based at least in part on the address, which one or more of a plurality of storage devices the request corresponds to;
determining, based at least in part on the address, a respective sub-request corresponding to each of the determined storage devices;
sending the sub-requests to the corresponding determined storage devices;
accepting respective sub-status from each of the determined storage devices;
determining an overall status based at least in part on each of the respective sub-statuses;
providing the overall status to the host;
wherein the accepting the request, the determining the storage devices, the determining and the sending the sub-requests, the accepting the sub-statuses, and the determining and the providing the overall status are performed by a particular one of the storage devices;
wherein the accepting the request is via a host-interface protocol and the sending the sub-requests and the accepting the sub-statuses are via a peer-to-peer protocol operable independently of the host; and
wherein at least one of the storage devices implements storage that is accessible via one of the sub-requests and the at least one of the storage devices disables accesses via the host-interface protocol to the implemented storage.

EC145) The method of EC144, wherein the host-interface and the peer-to-peer protocols are compatible with a Peripheral Component Interconnect express (PCIe) channel.

EC146) The method of EC144, wherein the accepting the request comprises reading an entry in a submission queue retained in host memory.

EC147) The method of EC144, wherein the providing the overall status comprises writing an entry in a completion queue retained in host memory.

EC148) The method of EC144, further comprising independently performing, by each of the determined storage devices, a data transfer portion of the corresponding sub-request.

EC149) The method of EC148, wherein the independently performing comprises accessing host memory.

EC150) A method comprising:
a first storage device reading a first request from a first one of a plurality of host request queues;
a second storage device reading a second request from a second one of the host request queues, the second host request queue being distinct from the first host request queue, the reading by the second storage device being independent of the reading by the first storage device;
the first storage device forwarding at least a portion of the first request to the second storage device;
the second storage device forwarding at least a portion of the second request to the first storage device, the forwarding by the second storage device being independent of the forwarding by the first storage device;
the first storage device accessing first storage in accordance with the at least the portion of the second request and returning a first status to the second storage device, based at least in part on the accessing by the first storage device; and
the second storage device accessing second storage in accordance with the at least the portion of the first request and returning a second status to the first storage device, based at least in part on the accessing by the second storage device, the accessing by the second storage device being independent of the accessing by the first storage device, the second storage being distinct from the first storage.

EC151) The method of EC150, wherein the host request queues are accessible by a host, and further comprising the second storage device returning a third status to the host based at least in part on the second request and the first storage device returning a fourth status to the host based at least in part on the first request.

EC152) The method of EC150, wherein the at least the portion of the second request is at least a first portion, and further comprising the second storage device accessing third storage in accordance with at least a second portion of the second request, the first and the second portions of the second request being distinct portions of the second request.

EC153) The method of EC150, wherein the host request queues are accessible by a host and the at least the portion of the second request is at least a first portion, and further comprising the second storage device accessing third storage in accordance with at least a second portion of the second request and the second storage device returning a third status to the host based at least in part on the accessing of the third storage, the first and the second portions of the second request being distinct portions of the second request.

EC154) A method comprising:
providing to a host a single logical interface to a plurality of physical storage devices, one of the physical storage devices operating as a primary agent and one or more of the physical storage devices operating as secondary agents;
wherein the providing comprises
the primary agent accepting a request from the host to access storage, forwarding the request as one or more sub-requests to all or any portions of the secondary agents, accepting sub-statuses associated with the sub-requests from the secondary agents that the sub-requests were forwarded to, and providing an overall status based at least on the sub-statuses to the host, and
the all or any portions of the secondary agents accepting the sub-requests, translating host-context addressing information of the sub-requests to local-context addressing information, accessing local storage based at least in part on the local-context addressing information, and providing the sub-statuses to the primary agent;
wherein the primary agent, when queried by the host regarding storage capacity, reports the storage capacity based at least in part on storage implemented by the primary agent and storage implemented by the secondary agents; and
wherein each of the secondary agents, when queried by the host regarding storage capacity, report a respective storage capacity based at least in part on the storage capacity reported by the primary agent.

EC155) The method of EC154, wherein the storage capacity reported by the primary agent is increased in accordance with at least a portion of the storage implemented by a particular one of the secondary agents; and further comprising the particular secondary agent reporting to the host a storage capacity of the particular secondary agent as decreased in accordance with the at least a portion of the storage implemented by the particular second agent.

EC156) The method of EC154, wherein a particular one of the secondary agents, when queried by the host regarding storage capacity, reports back zero storage capacity if all of the storage implemented by the particular secondary agent is accounted for in the storage capacity reported by the primary agent.

EC157) The method of EC154, wherein the primary agent is enabled to communicate with the host via a host-interface protocol.

EC158) The method of EC154, wherein the primary agent and the secondary agents are enabled to communicate with each other via a peer-to-peer protocol.

EC159) The method of EC154, wherein the primary agent is enabled to communicate with the host and at least one of the secondary agents via a same physical link.

EC160) A system comprising:
host interface logic enabled to interface to a host via a host-interface protocol and to interface to a secondary agent via a peer-to-peer protocol, the interfacing to the host comprising reading a storage request from an entry in a submission queue, the interfacing to the secondary agent comprising forwarding a storage sub-request to the secondary agent, the interfacing to the host and the interfacing to the secondary agent being via a same physical channel;
sub-request generation logic enabled to determine the sub-request based at least in part on address information comprised in the storage request; and
storage capacity reporting logic enabled to report back to the host a total storage capacity, the total storage capacity based at least in part on a storage capacity of the secondary agent.

EC161) The system of EC160, wherein the physical channel is compatible with at least one of a Peripheral Component Interconnect express (PCIe) channel and an Infiniband channel.

EC162) The system of EC160, further comprising one or more of the host, the secondary agent, and a switch coupling the host to the host interface logic and/or the secondary agent.

EC163) The system of EC160, further comprising storage interface logic and mass storage, the storage interface logic enabled to interface to the mass storage, and wherein the total storage capacity is further in accordance with a storage capacity of the mass storage.

EC164) The system of EC160, wherein the interfacing to the host further comprises writing an overall status to an entry in a completion queue, and the interfacing to the secondary agent further comprises forwarding a sub-status from the secondary agent to the host as at least part of the overall status via the writing of the overall status to the completion queue; and further comprising sub-status accumulation logic enabled to determine the overall status based at least in part on the sub-status.

EC165) The system of EC160, wherein system is comprised in a Solid-State Disk (SSD).

EC166) A system comprising:
host interface logic enabled to interface to a host via a host-interface protocol and to interface to a secondary agent via a peer-to-peer protocol, the interfacing to the host comprising reading a storage request from an entry in a submission queue, the interfacing to the secondary agent comprising forwarding a storage sub-request to the secondary agent, the interfacing to the host and the interfacing to the secondary agent being via a same physical channel;
sub-request generation logic enabled to determine the sub-request based at least in part on address information comprised in the storage request; and
storage capacity reporting logic enabled to report back to the host a total storage capacity, the total storage capacity based at least in part on a storage capacity of the secondary agent.

EC167) The system of EC166, wherein the physical channel is compatible with at least one of a Peripheral Component Interconnect express (PCIe) channel and an Infiniband channel.

EC168) The system of EC166, further comprising one or more of the host, the primary agent, a switch coupling the host to the host interface logic and/or the primary agent, and all or any portions of the mass storage.

EC169) The system of EC166, wherein the mass storage comprises a plurality of flash storage devices.

EC170) The system of EC166, wherein the system is comprised in a solid-state disk.

EC171) A system comprising:
a storage subsystem having physical components comprising a plurality of physical storage devices and a physical switch-portion having a plurality of ports;
a host coupled via a dedicated point-to-point link to a dedicated port of the plurality of ports;
wherein each physical storage device comprises:
at least one range of storage,
at least one port enabled to be coupled via a respective point-to-point link to a respective port of the plurality of ports, and
agent logic enabling the physical storage device to operate as at least one agent of one or more primary agents and one or more secondary agents of the storage subsystem, each primary agent enabled to accept host-initiated storage access requests, to generate sub-requests, and to accumulate sub-statuses, each secondary agent enabled to accept at least one of the sub-requests and to generate at least one of the sub-statuses; and
wherein the storage subsystem is enabled to operate one or more logical storage devices, each logical storage device enabling the host to access via a single logical interface an aggregation of the storage ranges distributed over the storage devices corresponding to one primary agent of the primary agents and at least one secondary agent of the secondary agents.

EC172) The system of EC171, further comprising:
wherein the agent logic comprises configurability logic enabling the physical storage device to operate at least sometimes as at least one of the primary agents and at least sometimes as at least one of the secondary agents.

EC173) The system of EC171, further comprising:
wherein the agent logic comprises concurrency logic enabling the physical storage device to operate concurrently as at least one of the primary agents and at least one of the secondary agents.

EC174) The system of EC171, further comprising:
wherein the agent logic comprises dedicated-agent logic enabling the physical storage device to operate as a dedicated one of the primary agents and the secondary agents.

EC175) The system of EC171, further comprising:
wherein a first logical storage device of the logical storage devices comprises at least a first primary agent of the primary agents and one or more of the secondary agents; and
wherein the physical switch-portion enables host-occluded peer-to-peer communications between the first primary agent and each of the secondary agents.

EC176) The system of EC171, further comprising:
wherein the physical switch-portion having a plurality of ports is a first physical switch-portion having a first plurality of ports and the physical components further comprise a second physical switch-portion having a second plurality of ports; and
wherein each physical storage device further comprises at least one port enabled to be coupled via a respective point-to-point link to a respective port of the second plurality of ports.

EC177) The system of EC176, further comprising:
wherein the second physical switch-portion enables storage redundancy techniques implemented via peer-to-peer communication with inconsequential impact on bandwidth available for communications via the first physical switch-portion.

EC178) The system of EC177, further comprising:
wherein the peer-to-peer communication is via the second physical switch-portion and comprises one or more of control information, untransformed redundancy data, and transformed redundancy data.

EC179) The system of EC176, further comprising:
wherein a unitary physical switch comprises the first physical switch-portion and the second physical switch-portion.

EC180) The system of EC171, further comprising:
wherein the single logical interface enables one or more of mirroring, striping, RAID parity, and fail-over, to be implemented via host-occluded peer-to-peer communications between the primary and secondary agents.

EC181) The system of EC171, further comprising:
wherein the primary agents comprise a first primary agent and a second primary agent, the secondary agents comprise a first secondary agent and a second secondary agent, the physical storage devices comprise a first physical storage device and a second physical storage device, and the logical storage devices comprise a first logical storage device and a second logical storage device;

wherein with respect to a first subset of the requests, the first physical storage device operates as the first primary agent and as the first secondary agent;

wherein with respect to a second subset of the requests, the second physical storage device operates as the second primary agent and as the second secondary agent; and wherein the first logical storage device comprises the first primary agent and the second secondary agent, the second logical storage device comprises the second primary agent and the first secondary agent, and the first logical storage device operates concurrently with the second logical storage device.

EC182) The system of EC181, further comprising:

wherein the first subset of the requests are from a first host request queue and the second subset of the requests are from a second host request queue.

EC183) The system of EC181, further comprising:

wherein the host is a first host and the first subset of the requests are from the first host, and the second subset of the requests are from a second host.

EC184) The system of EC181, further comprising:

wherein the first subset of the requests and the second subset of the requests are from the same host request queue.

EC185) The system of EC171, further comprising:

wherein a first logical storage device of the logical storage devices comprises at least a first primary agent of the primary agents and at least a first secondary agent of the secondary agents;

wherein the aggregation of the storage ranges of the agents of the first logical storage device is a first logical storage sub-space; and wherein the agent logic comprises storage-recovery logic enabling the first primary agent to identify free storage available to be provided by one or more of the agents and, subsequent to a determination that a particular portion of the first logical storage sub-space is no longer being provided by one of the agents, to allocate from the free storage to restore the previously provided particular portion.

EC186) The system of EC171, further comprising:

wherein a first logical storage device of the logical storage devices comprises at least a first primary agent of the primary agents and at least a first secondary agent of the secondary agents, the physical storage devices comprise a first physical storage device and a second physical storage device, and wherein the first physical device initially operates as the first primary agent;

a monitoring agent enabled to determine that the first primary agent has failed and to transmit a primary-agent-replacement request to a selected one of the other agents; and wherein the agent logic of the second physical device comprises primary-agent-replacement logic enabling the second physical storage device to operate as a replacement for the first primary agent in response to receiving the primary-agent-replacement request from the monitoring agent.

EC187) A method comprising:

operating as a primary agent a first storage device and operating as one or more secondary agents at least a second storage device, each storage device of the primary and secondary agents having at least one respective storage range;

the primary agent providing a logical interface enabling the host to access as a unitary logical device an aggregation of the storage ranges distributed over the storage devices of the primary and secondary agents, primary agent communications with the host via the logical interface comprising storage access requests accepted by the primary agent from the host and overall status sent by the primary agent to the host;

the primary agent forwarding each request accepted as one or more sub-requests to all or any portions of the secondary agents, accepting sub-statuses associated with the sub-requests from the secondary agents that the sub-requests were forwarded to, and formulating each overall status sent based at least on the sub-statuses; and the all or any portions of the secondary agents accepting the sub-requests, translating host-context addressing information of the sub-requests to local-context addressing information, accessing local storage based at least in part on the local-context addressing information, and providing the sub-statuses to the primary agent.

EC188) The method of EC187, further comprising:

the primary agent determining an aggregated storage capacity of the unitary logical device based at least in part on the storage ranges of the primary and secondary agents;

in response to the host querying the unitary logical device regarding storage capacity, the primary agent reporting the aggregated storage capacity; and in response to the host querying the secondary agents regarding storage capacity, each of the secondary agents reporting a respective storage capacity that excludes representation of any storage range of the secondary agent that is represented in the aggregated storage capacity.

EC189) The method of EC187, further comprising:

in response to the host querying a particular one of the secondary agents regarding storage capacity, the particular secondary agent reporting back a particular storage capacity that excludes representation of those portions of storage implemented by the particular secondary agent that are represented in an aggregated storage capacity determined by the primary agent.

EC190) The method of EC187, further comprising:

performing at least some of the primary agent communications with the host in accordance with a host-interface protocol.

EC191) The method of EC187, further comprising:

performing at least some of the primary agent communications with the host and at least some primary agent communications with at least one of the secondary agents via sharing a same physical link; and wherein the primary agent communications with at least one of the secondary agents comprise at least some of the sub-requests and at least some of the sub-statuses exchanged between the primary agent and the secondary agents)

EC192) The method of EC187, further comprising:

performing at least some primary agent communications with the secondary agents in accordance with a peer-to-peer protocol; and wherein the primary agent communications with the secondary agents comprise at least the sub-requests and the sub-statuses exchanged between the primary agent and the secondary agents.

EC193) The method of EC192, wherein:

the primary agent communications with the secondary agents further comprise exchanging redundancy information via the peer-to-peer protocol.

EC194) An apparatus comprising:
means for operating as a primary agent a first storage device and operating as one or more secondary agents at least a second storage device, each storage device of the primary and secondary agents having at least one respective storage range;
means for the primary agent providing a logical interface enabling the host to access as a unitary logical device an aggregation of the storage ranges distributed over the storage devices of the primary and secondary agents, primary agent communications with the host via the logical interface comprising storage access requests accepted by the primary agent from the host and overall status sent by the primary agent to the host;
means for the primary agent forwarding each request accepted as one or more sub-requests to all or any portions of the secondary agents, accepting sub-statuses associated with the sub-requests from the secondary agents that the sub-requests were forwarded to, and formulating each overall status sent based at least on the sub-statuses; and
means for the all or any portions of the secondary agents accepting the sub-requests, translating host-context addressing information of the sub-requests to local-context addressing information, accessing local storage based at least in part on the local-context addressing information, and providing the sub-statuses to the primary agent.

EC195) The apparatus of EC194, further comprising:
means for the primary agent determining an aggregated storage capacity of the unitary logical device based at least in part on the storage ranges of the primary and secondary agents;
means for in response to the host querying the unitary logical device regarding storage capacity, the primary agent reporting the aggregated storage capacity; and
means for in response to the host querying the secondary agents regarding storage capacity, each of the secondary agents reporting a respective storage capacity that excludes representation of any storage range of the secondary agent that is represented in the aggregated storage capacity.

EC196) The apparatus of EC194, further comprising:
means for in response to the host querying a particular one of the secondary agents regarding storage capacity, the particular secondary agent reporting back a particular storage capacity that excludes representation of those portions of storage implemented by the particular secondary agent that are represented in an aggregated storage capacity determined by the primary agent.

EC197) The apparatus of EC194, further comprising:
means for performing at least some of the primary agent communications with the host in accordance with a host-interface protocol.

EC198) The apparatus of EC194, further comprising:
means for performing at least some of the primary agent communications with the host and at least some primary agent communications with at least one of the secondary agents via sharing a same physical link; and
wherein the primary agent communications with at least one of the secondary agents comprise at least some of the sub-requests and at least some of the sub-statuses exchanged between the primary agent and the secondary agents.

EC199) The apparatus of EC194, further comprising:
means for performing at least some primary agent communications with the secondary agents in accordance with a peer-to-peer protocol; and
wherein the primary agent communications with the secondary agents comprise at least the sub-requests and the sub-statuses exchanged between the primary agent and the secondary agents.

EC200) The apparatus of EC199, wherein:
the primary agent communications with the secondary agents further comprise redundancy information exchanged via the peer-to-peer protocol.

Scalable Storage System

FIG. 1A illustrates selected structural details of an embodiment of a technique for scalable storage devices, including a host, host visible storage having one or more storage devices operable as respective primary agents, and host invisible storage having one or more storage devices operable as respective secondary agents. Host 100 is coupled to Host Visible Storage 110 and Host Invisible Storage 120 via Host—Storage Device Coupling 180. The Host—Storage Device Coupling as well as the Host Visible and Host Invisible Storages are optionally implemented as a pluggable module (illustrated as Add-In Card 190A) and/or coupling 101 is optionally implemented as a cable. In some embodiments, all or any portions of the add-in card are implemented as an SSD. The Host Visible Storage has one or more storage devices (illustrated as Storage Device 110.A and Storage Device 110.N). Similarly, the Host Invisible Storage has one or more storage devices (illustrated as Storage Device 120.A and Storage Device 120.N). In various embodiments, any one or more of the storage devices are physical storage devices, such as SSDs.

Couplings 101, 111.A, 111.N, 121.A, and 121.N enable request, status, and data transfers between the Host, the Host Visible Storage, and the Host Invisible Storage. One or more of the couplings enable the transfers via a host-interface protocol (such as the Host acting as a master and one of the elements of the Host Visible Storage operating as a slave). One or more of the couplings enable the transfers via a peer-to-peer protocol (such as one of the elements of the Host Visible Storage operating as a primary agent and one of the elements of the Host Invisible Storage or one of the other elements of the Host Visible Storage operating as a secondary agent). In various embodiments, one or more of the couplings are compatible with an interface standard (such as PCIe or Infiniband). In various embodiments, Host—Storage Device Coupling 180 is implemented via one or more PCIe and/or Infiniband switches. In some embodiments, Host—Storage Device Coupling 180 is integrated with Host 100 as all or any portions of a host computing complex.

The Host Visible Storage elements implement storage, and during initialization, the elements are configured to enable Host access of at least some of the implemented storage, thus providing storage that is 'visible' to the Host such as via a host-interface protocol. The Host Invisible Storage elements also implement storage, but during initialization, the elements are configured to disable Host access of at least some of the implemented storage, thus providing storage that is 'invisible' to the Host. However, the storage that is invisible to the host is indirectly accessible by the Host via elements of the Host Visible Storage, such as via a peer-to-peer protocol.

Dashed-arrow 151 conceptually illustrates information transfer between Host 100 and Storage Device 110.A, and is representative of information transfer between the Host and any of the elements of Host Visible Storage 110. The information transfers include one or more of a request originating from the Host to access storage, a status response relating to the request, and a data transfer relating to the request. The request includes one or more of an address (such as an LBA) and a length (such as in bytes or LBA quanta). The information transfers from the host to the storage device are communicated via coupling 101, Host—Storage Device Coupling 180, and then coupling 111.A, and in reverse for the information transfers from the storage device to the host.

Dashed-arrow 152 conceptually illustrates information transfer between Storage Device 110.A and Storage Device 120.A, and is representative of peer-to-peer information transfer between any of the elements of Host Visible Storage 110, and any of the elements of Host Invisible Storage 120. The information transfers include one or more of a sub-request from Storage Device 110.A (acting as a primary agent) to any of the elements of Host Invisible Storage 120 (acting as a secondary agent), a sub-status response relating to the sub-request, and a data transfer relating to the sub-request. The sub-request includes one or more of an address (such as an LBA) and a length (such as in bytes or LBA quanta). The information transfers from the primary agent to the secondary agent are communicated via coupling 111.A, Host—Storage Device Coupling 180, and then coupling 121.A, and in reverse for the information transfers from the secondary agent to the primary agent.

Dashed-arrow 153 conceptually illustrates information transfer between Storage Device 110.A and Storage Device 110.N, and is representative of peer-to-peer information transfer between any of the elements of Host Visible Storage 110. The information transfers include one or more of a sub-request from Storage Device 110.A (acting as a primary agent) to any of the other elements of Host Visible Storage 110 (acting as a secondary agent), a sub-status response relating to the sub-request, and a data transfer relating to the sub-request. The information transfers from the primary agent to the secondary agent are communicated via coupling 111.A, Host—Storage Device Coupling 180, and then coupling 111.N, and in reverse for the information transfers from the secondary agent to the primary agent.

Dashed-arrow 154 conceptually illustrates information transfer between Host 100 and Storage Device 120.A, and is representative of information transfer between the Host and any of the elements of Host Invisible Storage 120. The information transfers include one or more of an overall status response relating to the request, and a data transfer relating to the request. Although not illustrated as such for clarity in the figure, the information transfers from the host to the storage device are communicated via coupling 101, Host—Storage Device Coupling 180, and then coupling 121.A, and in reverse for the information transfers from the storage device to the host.

In some embodiments, requests originating from a host are via one or more submission queues in host memory that are accessible via coupling 101 (e.g. by a primary agent reading entries in a submission queue via one or more DMA operations). In some embodiments, statuses provided to a host are via one or more completion queues in host memory that are accessible to primary and/or secondary agents (e.g. by a primary/secondary agent writing entries in a completion queue via one or more DMA operations). In some embodiments, requests and/or statuses are communicated at least in part via one or more doorbell and/or tail registers, optionally in conjunction with one or more submission and/or completion queues. In some embodiments, requests and/or statuses are communicated to primary agents at least in part via programmed IO operations initiated by a host. In some embodiments, submission and/or completion queue descriptors are communicated to primary agents at least in part via programmed IO operations initiated by a host.

In some embodiments, accepting a request from a host includes reading one or more entries from a submission queue. E.g. a host writes a particular entry in a submission queue retained in host memory, modifies a tail register accordingly, and sets a corresponding doorbell register (such as a doorbell register implemented in and/or accessible by a primary agent). In response to the setting of the doorbell register, the primary agent accesses the tail register and reads the particular submission queue entry (such as via a DMA read from the host memory). In some embodiments, providing status to a host includes writing one or more entries in a completion queue. E.g. a primary agent writes a particular entry in a completion queue retained in host memory (such as via a DMA write to the host memory), modifies a tail register accordingly, and notifies the host of a completed operation (e.g. by setting a corresponding doorbell register or providing an interrupt). In response to the setting of the doorbell register, the host accesses the tail register and reads the particular completion queue entry.

In some embodiments, sub-requests are sent to secondary agents using different routing, addressing, and/or encapsulation than a request the sub-requests are determined from, and the sub-requests are transported over a same coupling as the request. For example, in an exemplary system using PCIe couplings for transport of any or all of request, sub-request, and sub-status traffic, a request is provided to a primary agent as a completion from a read request, while a sub-request is forwarded to a secondary agent in an MsgD request. In some embodiments, a sub-request is repackaged to include information in addition to a request the sub-request is determined from. For example, a repackaged sub-request includes additional information such as flow control, augmented routing information, or other additional information about contents of the request. In some embodiments, augmented routing information enables sending the sub-request via one or more couplings to remote secondary agents.

In some embodiments, sub-statuses are sent to primary agents using different routing, addressing, and/or encapsulation than a request the sub-statuses correspond to, and the sub-statuses are transported over a same coupling as the request. For example, in an exemplary system using PCIe couplings for transport of any or all of request, sub-request, and sub-status traffic, a request is provided to a primary agent as a completion from a read request, while a sub-status is returned to the primary agent by a secondary agent in an MsgD request. In some embodiments, a sub-status is repackaged to include information in addition to the sub-status and/or a request the sub-status corresponds to. For example, a repackaged sub-status includes additional information such as flow control, augmented routing information, or other additional information about contents of the request. In some embodiments, augmented routing information enables sending the sub-status via one or more couplings from remote secondary agents to primary agents.

As a specific example, Host 100, acting as a master, provides a request to access storage (conceptually illustrated by dashed-arrow 151) via a host-interface protocol to Storage Device 110.A. In response, Storage Device 110.A, acting as a slave, responds to the request. Storage Device 110.A accepts the request (also conceptually illustrated by dashed-arrow 151) via the host-interface protocol, and then determines whether storage relating to the request is implemented by Storage Device 110.A and/or by one or more of the elements of Host Invisible Storage 120 or any of the other elements of Host Visible Storage 110. Storage Device 110.A then processes the request internally (if at least some of the storage is implemented by Storage Device 110.A) and/or, acting as a primary agent, forwards the request, as one or more peer-to-peer sub-requests (conceptually illustrated by dashed-arrow 152) via the peer-to-peer protocol to Storage Device 120.A. Storage Device 120.A, acting as a secondary, accepts the sub-request (also conceptually illustrated by dashed-arrow 152) via the peer-to-peer protocol, and then processes the sub-request internally. Storage Device 120.A then returns sub-status corresponding to the sub-request to Storage Device 110.A (also conceptually illustrated by dashed-arrow 152). Storage Device 110.A then determines an overall status for the request and provides the overall status to the host (conceptually illustrated by dashed-arrow 151). Alternatively, rather than Storage Device 120.A returning the sub-status to Storage Device 110.A (to then forward to Host 100), Storage Device 120.A returns the sub-status to Host 100 directly (conceptually illustrated by dashed-arrow 154).

Continuing with the specific example, data for reads flows similarly to status. Storage Device 120.A returns data corresponding to the sub-request to Storage Device 110.A (conceptually illustrated by dashed-arrow 152) and then Storage Device 110.A provides the data to the host (conceptually illustrated by dashed-arrow 151). Alternatively, rather than Storage Device 120.A returning the data to Storage Device 110.A (to then forward to Host 100), Storage Device 120.A returns the data to Host 100 directly (conceptually illustrated by dashed-arrow 154). Status and data for a particular request are not restricted to a same flow. For example, for one request, status and data both flow from a secondary device (e.g. Storage Device 120.A) via a primary agent (e.g. Storage Device 110.A) to Host 100. For another request, status flows from the secondary agent via the primary agent to the host and data flows directly from the secondary agent to the host. Data for writes flows from the host to the secondary agent via the primary agent (conceptually illustrated by dashed-arrows 151 and 152), or alternatively directly from the host to the secondary agent (conceptually illustrated by dashed-arrow 154).

Other examples include any one or more of the elements of Host Visible Storage 110 acting as one or more primary agents and any one or more of the elements of Host Invisible Storage 120 or any one or more of the other elements of Host Visible Storage 110 acting as one or more secondary agents.

Figure 1B:
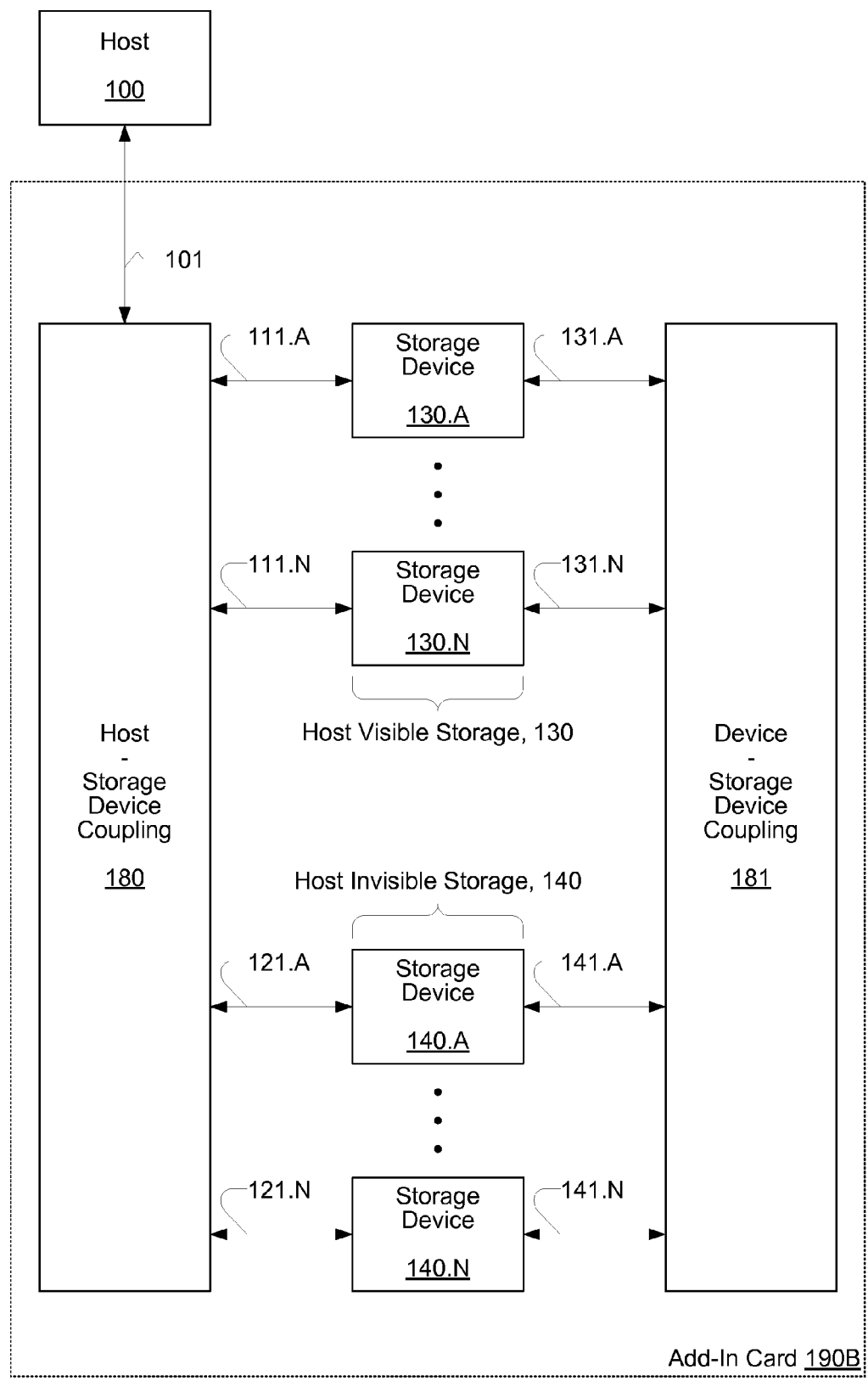
FIG. 1B illustrates selected structural details of another embodiment of a technique for scalable storage devices, including a host, host visible storage having one or more storage devices operable as respective primary agents, and host invisible storage having one or more storage devices operable as respective secondary agents.

FIG. 1B illustrates selected structural details of another embodiment of a technique for scalable storage devices, including a host, host visible storage having one or more storage devices operable as respective primary agents, and host invisible storage having one or more storage devices operable as respective secondary agents. The technique uses some elements that are identical in operation and structure to similarly identified elements of FIG. 1A (Host 100, Host—Storage Device Coupling 180, and couplings 101, 111.A, 111.N, 121.A, and 121.N). Host Visible Storage 130 is similar to Host Visible Storage 110 of FIG. 1A, except that the storage devices therein (Storage Device 130.A and Storage Device 130.N) are each enabled to communicate via an additional coupling (couplings 131.A and 131.N, respectively). Host Invisible Storage 140 is similar to Host Invisible Storage 120 of FIG. 1A, except that the storage devices therein (Storage Device 140.A and Storage Device 140.N) are enabled to communicate via an additional coupling (couplings 141.A and 141.N, respectively). Device—Storage Device Coupling 181 is coupled to couplings 131.A, 131.N, 141.A and 141.N, and enables additional communication bandwidth between any of the elements of Host Visible Storage 130 and Host Invisible Storage 140, useful, e.g., for peer-to-peer communication. For example, Device—Storage Device Coupling 181 enables additional communication bandwidth between Storage Device 130.A and any of the elements of Host Invisible Storage 140. For another example, Device—Storage Device Coupling 181 enables additional communication bandwidth between Storage Device 130.A and Storage Device 130.N.

The Host—Storage Device Coupling and the Device—Storage Device Coupling as well as the Host Visible and Host Invisible Storages are optionally implemented as a pluggable module (illustrated as Add-In Card 190B) and/or coupling 101 is optionally implemented as a cable. In some embodiments, all or any portions of the add-in card are implemented as an SSD. In various embodiments, any one or more of the storage devices are SSDs.

In some embodiments and/or usage scenarios, additional communication bandwidth provided by Device—Storage Device Coupling 181 enables storage redundancy techniques implemented via peer-to-peer communication (such as RAID 5), with little or no impact on bandwidth available for communication between the host and the storage devices. The peer-to-peer communication includes one or more of communication of untransformed data (such as during a RAID mirroring operation), transformed data (such as XOR data during RAID parity generation and/or writing), and control information.

In some embodiments, RAID redundancy is enabled by distributing RAID data in a striped manner across a plurality of storage devices, such as orthogonal to how (non-RAID) data is distributed. In some situations, when a host request is a read, information is read from two or more of the storage devices. When a host request is a write, maintaining RAID redundancy information optionally includes performing RMW operations or alternatively data copying operations with respect to two or more of the storage devices.

When a primary agent or a secondary agent retrieves data as a result of a host write request, the agent communicates a peer-to-peer request (such as via Device—Storage Device Coupling 181) to another agent (a primary agent or a secondary agent), along with particular RAID data. In some circumstances (such as mirror RAID), the particular RAID data is a copy of data for the write request. In some circumstances (such as RAID 5), the particular RAID data is computed based on the data for the write request, and previous data corresponding to an LBA of the write request (e.g. the previous data is used in a RMW operation such as an XOR with the data for the write request).

For example, the agent receiving the data for the write request computes a RAID delta by XORing the data for the write request with the previous data corresponding to the LBA of the write request. The agent sends the RAID delta to the one of the agents storing RAID redundancy associated with the LBA. The agent storing the RAID redundancy then performs an RMW to update the RAID redundancy using the RAID delta. If the agent storing the RAID redundancy has been informed that multiple updates to the RAID redundancy are expected, then the agent storing the RAID redundancy optionally and/or selectively combines the RMW operations for greater efficiency.

In some embodiments and/or usage scenarios, a primary agent informs another agent (another primary agent or a secondary agent) how many RAID updates there will be for particular LBAs. The informed agent is enabled, in various embodiments, to cache information relating to the RAID updates until all of the updates for the particular LBAs are performed. In various embodiments, the number of RAID updates is communicated as part of a sub-request, either implicitly or explicitly. When the RAID updates are completed, the informed agent sends a sub-status to the primary agent.

In various embodiments, a plurality of data transfers relating to a single host request is performed wholly or partially independently. For example, in some RAID RMW scenarios, transfer of write data is independent of transfer of previously accumulated parity data. In various situations, the write data is read from host memory by any of a primary agent and a plurality of secondary agents, the accumulated parity data is read from a storage device by any of the primary and secondary agents, and then new parity data is written, e.g., to the storage device the accumulated parity data was read from.

In various embodiments, one or more of couplings 131.A, 131.N, 141.A and 141.N are identical or substantially similar to couplings 111.A, 111.N, 121.A, and 121.N of FIG. 1A. In some embodiments, device-storage coupling Device—Storage Device Coupling 181 is identical or substantially similar in implementation to Host—Storage Device Coupling 180. In some embodiments, Host—Storage Device Coupling 180 and Device—Storage Device Coupling 181 are combined into a single element. In some embodiments, any one or more of couplings 131.A, 131.N, 141.A and 141.N are coupled to additional ports of a variation of Host—Storage Device Coupling 180 instead of to Device—Storage Device Coupling 181.

In various embodiments, such as some embodiments related to either of FIG. 1A or FIG. 1B, host visible storage has one or more storage devices operable as respective primary agents and zero or more storage devices operable as secondary agents, while host invisible storage has zero or more storage devices operable as respective secondary agents.

In various embodiments, a storage device corresponds to a physical storage device, and the physical storage device is enabled to implement, according to one or more operating modes, any combination of host visible storage and host invisible storage. In a first operating scenario, a particular physical device is operated to implement only host visible storage. In a second operating scenario, the particular physical device is operated to implement only host invisible storage. In a third operating scenario, the particular physical device is operated to implement a combination of host visible storage and host invisible storage. In some situations (such as in response to a change in workload and/or a failure), operation is dynamically changed from one of the operating scenarios to another.

For example, with respect to FIG. 1A, operation begins as illustrated, with Host Visible Storage 110 having Storage Device 110.A and Storage Device 110.N, and Host Invisible Storage 120 having Storage Device 120.A and Storage Device 120.N. Continuing with the example, each of Storage Devices 110.A, 110.N, 120.A and 120.N corresponds to respective physical storage devices. In response to a change in workload, Storage Device 110.N is dynamically (re)configured from operating as an element of the Host Visible Storage to operating as an element of the Host Invisible Storage. After the dynamic reconfiguration, Host Visible Storage 110 has Storage Device 110.A, and Host Invisible Storage 120 has Storage Device 110.N, Storage Device 120.A, and Storage Device 120.N (not illustrated).

For another example, with respect to FIG. 1B, operation begins as illustrated, with Host Visible Storage 130 having Storage Device 130.A and Storage Device 130.N, and Host Invisible Storage 140 having Storage Device 140.A and Storage Device 140.N. Continuing with the example, each of Storage Devices 130.A, 130.N, 140.A, and 140.N corresponds to respective physical storage devices. In response to a failure of Storage Device 130.A, Storage Device 140.A is dynamically (re)configured to operate as an element of the Host Visible Storage as well as continuing to operate as an element of the Host Invisible Storage. For instance, storage implemented by Storage Device 140.A is allocated between being used as replacing all or any portions of storage implemented by Storage Device 130.A before the failure, and continuing use as Host Invisible Storage. After the dynamic reconfiguration, Host Visible Storage 130 has a portion of storage implemented by Storage Device 140.A and Storage Device 130.N, and Host Invisible Storage 140 has Storage Device 140.A, (less the portion used to replace Storage Device 130.A) and Storage Device 140.N (not illustrated).

In various embodiments, host visible storage is storage that is accessible to a host via a transparent switch, and/or host invisible storage is storage that is hidden from the host via a non-transparent switch. The host visible storage and the host invisible storage are enabled for peer-to-peer communication, e.g., via all or any portions of the transparent and/or the non-transparent switches. In some embodiments, a unified switch provides a transparent portion and a non-transparent portion corresponding respectively to the aforementioned transparent and non-transparent switches. For example, with respect to FIG. 1B, one or more of all or any portions of Host 100, coupling 101, Host—Storage Device Coupling 180, and Device—Storage Device Coupling 181 implement a unified switch. The unified switch is operable as a transparent switch with respect to one or more of the elements of Host Visible Storage 130 and also simultaneously operable as a non-transparent switch with respect to one or more of the elements of Host Invisible Storage 140.

Scalable Storage System Operation

Figure 2:
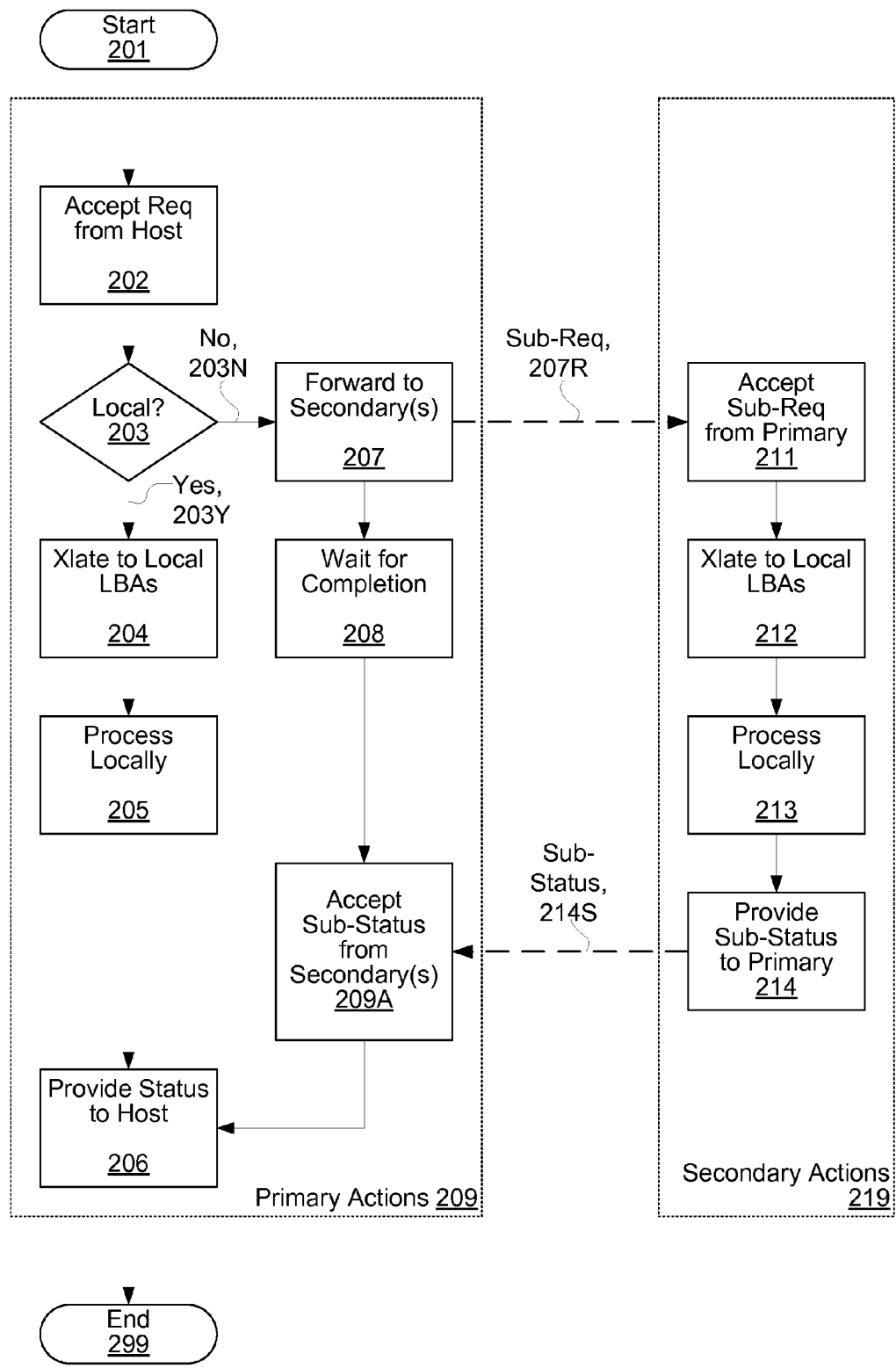
FIG. 2 illustrates selected processing details of an embodiment of a technique for scalable storage devices, including actions performed by a primary agent and one or more secondary agents.

FIG. 2 illustrates selected processing details of an embodiment of a technique for scalable storage devices. Illustrated are actions performed by a storage device acting as a primary agent (such as one or more of the elements of Host Visible Storage 110 of FIG. 1A) as "Primary Actions" 209, as well as actions performed by a storage device acting as a secondary agent (such as one or more of the elements of Host Invisible Storage 120 and/or any one or more of the other elements of Host Visible Storage 110 of FIG. 1A) as "Secondary Actions" 219.

A scenario where a request to access storage is satisfied by a single responding agent is first described, and then scenarios where a single request is satisfied by more than one responding agent are described. A host (such as Host 100 of FIG. 1A) provides a request to access storage to a storage device acting as a primary agent (represented conceptually by "Start" 201). The primary agent accepts the request from the host, such as by reading a submission queue entry retained in host memory, optionally providing handshaking with the host to indicate the request has been accepted without errors ("Accept Req from Host" 202). The primary agent then examines the request to determine if the request is to storage implemented by the primary agent ("Local?" 203). If so ("Yes", 203Y), then flow proceeds where the primary agent processes the address information provided with the request to translate the address information from a (host) context associated with the request to a (primary agent) context associated with corresponding storage implemented by the primary agent ("Xlate to Local LBAs" 204). For an example, the request specifies LBA 100, and the primary agent translates LBA 100 to LBA 0, corresponding to a beginning location of (local) storage implemented by the primary agent. The primary agent then performs the request ("Process Locally" 205), and provides status to the host ("Provide Status to Host" 206), such as by writing a completion queue entry retained in the host memory, thus completing processing for the request ("End" 299). In some embodiments, the translation comprises a mapping between a function of the LBAs and local storage addresses, similar to a page table.

If the request is not to storage implemented by the primary agent ("No", 203N), then flow within the primary agent proceeds to send the request, as a sub-request, to a storage device acting as a secondary agent ("Forward to Secondary(s)" 207). The primary agent determines a sub-request from the request, and communication of the sub-request from the primary agent to the secondary agent is illustrated by dashed-line "Sub-Req" 207R. Within the primary agent, flow then proceeds to await completion of the sub-request by the secondary agent ("Wait for Completion" 208). When the secondary agent has completed the sub-request (either with or without errors), the secondary agent supplies sub-status to the primary agent (illustrated conceptually by dashed-line "Sub-Status" 214S). The primary agent then accepts the sub-status from the secondary agent, optionally providing handshaking with the secondary agent to indicate the sub-status has been accepted without errors ("Accept Sub-Status from Secondary(s)" 209A). The primary agent then proceeds to provide the sub-status as status to the host ("Provide Status to Host" 206), and then processing for the request is complete ("End" 299).

Within the secondary agent, flow begins by accepting the sub-request from the primary agent, optionally providing handshaking with the primary agent to indicate the sub-request has been accepted without errors ("Accept Sub-Req from Primary" 211). The sub-request includes address information (such as an LBA) as provided by the host in the request that the sub-request corresponds to. The secondary agent processes the address information provided with the sub-request to translate the address information from a (host) context associated with the request to a (secondary agent) context associated with corresponding storage implemented by the secondary agent ("Xlate to Local LBAs" 212). For example, a request specifies LBA 200, the sub-request specifies LBA 200, and the secondary agent translates (host) LBA 200 to (local) LBA 0, corresponding to a beginning location of (local) storage implemented by the secondary agent. Continuing with the example, another request specifies LBA 201, a corresponding sub-request specifies LBA 201, and the secondary agent translates (host) LBA 201 to (local) LBA 1, corresponding to a next location of the (local) storage implemented by the secondary agent. Other examples are described, following, in a description of FIG. 3. After translating the sub-request, flow then proceeds where the secondary agent performs the request ("Process Locally" 213) and then returns sub-status to the primary agent ("Provide Sub-Status to Primary" 214) as illustrated by dashed-line "Sub-Status" 214S.

In a scenario where a single request to access storage is satisfied by more than one responding agent, conceptually the single request is broken into a plurality of sub-requests. Zero, one, or more of the sub-requests are satisfied by the primary agent, and zero, one, or more of the sub-requests are satisfied by zero, one, or more secondary agents. For example, a request to 400 with a length of two LBAs is satisfied by a sub-request to a secondary agent for LBA 400 and another sub-request to another secondary agent for LBA 401. Each secondary agent independently translates the LBA of the respective sub-request to an LBA corresponding to local storage of the respective secondary agent.

The primary agent determines which (if any) secondary agents are to receive sub-requests, based on address and length information of the request. Thus in FIG. 2, determining if the request is to storage implemented by the primary agent ("Local?" 203) is conceptually determined for each of a plurality of sub-requests. For some of the sub-requests the outcome is that the sub-requests are local, while for others of the sub-requests the outcome is that the other sub-requests are not local, and are forwarded along to one or more secondary agents as sub-requests ("Forward to Secondary(s)" 207 and "Sub-Req" 207R). A single secondary agent receives, in some scenarios, a single sub-request, while in other scenarios the single secondary agent receives a plurality of sub-requests. The flow represented in "Secondary Actions" 219 is then performed for each of the plurality of sub-requests (in any combination of serial and/or parallel processing, in various embodiments). In some scenarios, each of a plurality of secondary agents receives one or more sub-requests. The flow represented in "Secondary Actions" 219 is then performed independently by each of the plurality of secondary agents.

The primary agent determines how to map a single request into a plurality of sub-requests to one or more secondary agents as part of processing performed in "Forward to Secondary(s)" 207, such as via one or more functions and/or mapping tables (implemented, e.g. in Storage Device 110.A of FIG. 1A). When a plurality of sub-requests are sent to one or more secondary agents, the primary agent conceptually accumulates status information by waiting for completion ("Wait for Completion" 208) and accepting corresponding sub-status ("Accept Sub-Status from Secondary(s)" 209A) for each of the sub-requests independently of the other sub-requests. When sub-statuses for all of the sub-requests for a particular request have been received, the primary agent produces an overall status to provide to the host as part of processing performed in "Provide Status to Host" 206.

In some embodiments, secondary agents receive an entirety of a request as identical sub-requests (or alternately read the request from an entry in a submission queue). Each of the secondary agents then determines which portion (if any) of the request the respective secondary agent is to perform, and optionally which agent to send accumulated parity data (if any) to. For example, a request specifies LBA 500 with a length of 200 LBAs. A primary agent sends identical sub-requests to first and second secondary agents (or alternatively a single sub-request directed to the first and the second secondary agents). The sub-request(s) specify LBA 500 with a length of 200 LBAs. The first secondary agent (independently of the host and the second secondary agent) determines that LBAs 600-699 of the sub-request correspond to a portion of the sub-request that the first secondary agent is to perform. The second secondary agent (independently of the host and the first secondary agent) determines that LBAs 500- 599 of the sub-request correspond to a portion of the sub-request that the second secondary agent is to perform. The first and the second secondary agents determine that accumulated parity information is an appropriate one of the agents, dependent on a particular redundancy scheme.

In some embodiments and/or usage scenarios, status is provided directly to the host by a secondary agent, rather than forwarding through a primary agent (conceptually illustrated by dashed-arrow 154 of FIG. 1A). For example, the direct providing of status occurs when sub-requests for an entirety of a request are forwarded to a single secondary agent. The single secondary agent then returns status directly to the host (for example by the single secondary agent writing an entry to a completion queue retained in host memory). Note that the action of the single secondary agent writing the entry is indistinguishable by the host from the primary agent writing the entry, and thus even though the single secondary agent writes the entry, satisfaction of the request by the single secondary agent is transparent to the host. In some embodiments, a secondary agent (rather than a primary agent) accumulates sub-statuses for a plurality of sub-requests corresponding to a particular request and provides the accumulated sub-statuses as an overall status to the host.

In some embodiments, one or more storage devices operate simultaneously as a primary agent and as a secondary agent, at least with respect to some requests from one or more hosts. For example, a system has two storage devices. The first of the storage devices operates as a primary agent with respect to the second of the storage devices operating as a secondary agent, and the second storage device operates as a primary agent with respect to the first storage device operating as a secondary agent. More specifically, the first storage device accepts a request from a particular one of the hosts and sends the request, as a sub-request, to the second storage device. The second storage device accepts another request from the particular host and forwards the other request, as a sub-request, to the first storage device. In some embodiments and/or usage scenarios, the requests are from a same host request queue. In some embodiments and/or usage scenarios (such as where the requests are from distinct hosts), the requests are from distinct host request queues.

According to various embodiments, one or more of request, status, and data transfers are via DMA between, for example, memory accessible to (or part of) the host (such as host memory) and memory accessible to (or part of) one of the storage devices (such as a buffer implemented in a storage device). Thus, one or more of the aforementioned flows of request, status, and data transfers are by communication of one or more scatter/gather lists and subsequent DMA transfers according to the scatter/gather lists. In addition (or alternatively), one or more of the flows of request, status, and data transfers are by communication of completion and/or status queue information and subsequent DMA transfers to/from entries of the queues. In various embodiments, any of the request, the status, and the data transfers are performed directly and/or managed by one or more processors in one or more of the storage devices.

Addressing

Figure 3:
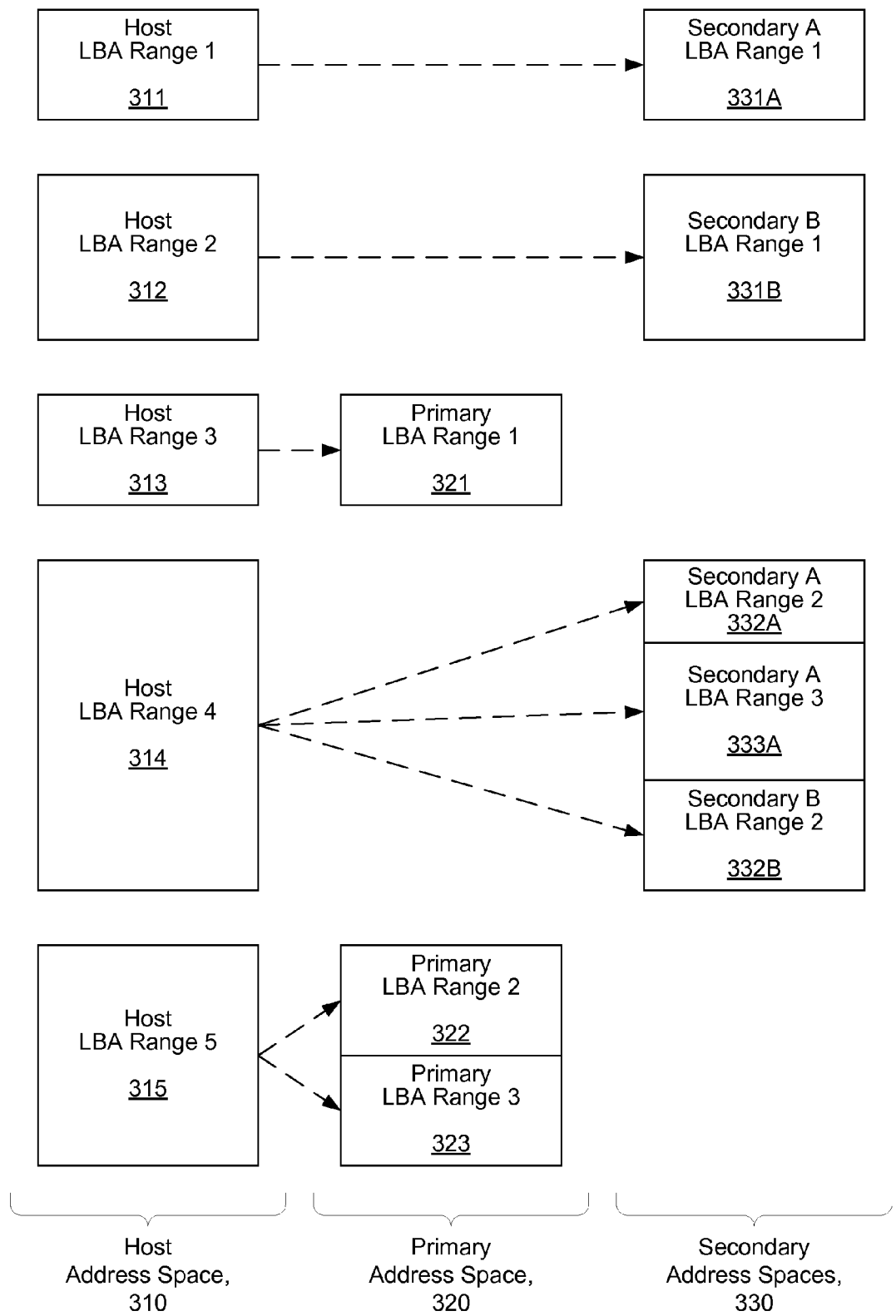
FIG. 3 illustrates selected details of host, primary agent, and secondary agent addressing in an embodiment of a technique for scalable storage devices.

FIG. 3 illustrates selected details of host, primary agent, and secondary agent addressing in an embodiment of a technique for scalable storage devices. The figure illustrates example windows of storage address space (Host Address Space 310) as viewed by a host (such as Host 100 of FIG. 1A). The host storage address space has Host LBA Ranges 1-5 311-315. The figure further illustrates example windows of storage address spaces (Primary Address Space 320) as viewed by a primary agent (such as any one of the elements of Host Visible Storage 110 of FIG. 1A). The primary agent storage address space has Primary LBA Ranges 1-3 321-323. The figure further illustrates example windows of storage address spaces (Secondary Address Spaces 330) as viewed by two secondary agents (Secondary Agents A and B, such as any two of the elements of Host Invisible Storage 120 and/or any of the other elements of Host Visible Storage 110 of FIG. 1A). The Secondary Agent A storage address space has Secondary A LBA Ranges 1-3 331A, 332A and 333A. The Secondary Agent B storage address space has Secondary B LBA Ranges 1-2 331B and 332B. While not drawn to any particular scale, in the figure the vertical height of the various address range elements varies, conceptually representing variation in how many locations are in each of the ranges.

In a first example, a single host address range (Host LBA Range 1 311) corresponds to a single address range of Secondary A (Secondary A LBA Range 1 331A). A primary agent (such as Storage Device 110.A of FIG. 1A) determines that a host request to an address within Host LBA Range 1 311 corresponds to storage that is not implemented by the primary agent (such as via processing associated with "Local?" 203 and "No", 203N of FIG. 2) and that the request corresponds to storage implemented by Secondary A. The primary agent then forwards a sub-request to Secondary A. Secondary A then translates the sub-request (such as processing associated with "Xlate to Local LBAs" 212 of FIG. 2), and performs a local access to storage accessible via Secondary A LBA Range 1 331A (such as processing via "Process Locally" 213 of FIG. 2).

In a second example, a single host address range (Host LBA Range 2 312) corresponds to a single address range of Secondary B (Secondary B LBA Range 1 331B). The primary agent determines that a request to an address within Host LBA Range 2 312 corresponds to storage that is implemented by Secondary B, and then forwards a sub-request to Secondary B. Secondary B then translates the sub-request and performs a local access to storage accessible via Secondary B LBA Range 1 331B.

In a third example, a single host address range (Host LBA Range 3 313) corresponds to a single address range of the primary agent (Primary LBA Range 1 321). The primary agent determines that a request to an address within Host LBA Range 3 313 corresponds to storage that is implemented by the primary agent, translates the request (such as via processing associated with "Xlate to Local LBAs" 204), and performs a local access to storage accessible via Primary LBA Range 1 321.

In a fourth example, a single host address range (Host LBA Range 4 314) corresponds to two address ranges of Secondary A (Secondary A LBA Ranges 2 332A and 3 333A) and a single address range of Secondary B (Secondary B LBA Range 2 332B). The primary agent determines that a request to an entirety of LBAs of Host LBA Range 4 314 (based, e.g. on a starting LBA and a number of contiguous LBAs to access) corresponds to storage that is implemented by Secondary A and Secondary B. The primary agent then forwards two sub-requests to Secondary A and a single sub-request to Secondary B. Secondary A translates the two sub-requests and performs local accesses to storage accessible via Secondary A LBA Ranges 2 332A and 3 333A (in series or wholly or partially in parallel). Secondary B translates the single sub-request and performs a local access to storage accessible via Secondary B LBA Range 2 332B.

In a fifth example, a single host address range (Host LBA Range 5 315) corresponds to two address ranges of the primary agent (Primary LBA Ranges 2 322 and 3 323). The primary agent determines that a request to an entirety of LBAs of Host LBA Range 5 315 (based, e.g. on a starting LBA and a number of contiguous LBAs to access) corresponds to storage that is implemented by the primary agent. The primary agent translates the request into two local LBA ranges, and performs local accesses to storage accessible via Primary LBA Ranges 2 322 and 3 323.

In some embodiments, a primary agent is enabled to forward each sub-request of a host request to a particular one of one or more secondary agents separately. In other embodiments, a primary agent is enabled to forward two or more sub-requests of a host request to a particular one of a plurality of secondary agents as a single combined sub-request. For example, in various embodiments, a primary agent determines one or more secondary agents to process one or more sub-requests of a host request and forwards the host request with a same LBA range and a same length to the one or more secondary agents. The one or more secondary agents are enabled to then interpret the LBA range and the length to determine respective portions of the host request each of the one or more secondary agents is to process and respond to. In other embodiments, a primary agent processes an LBA range and a length of a host request and sends a processed version of the LBA range and the length to each of one or more secondary agents. For example, if data is striped among N agents (N−1 secondary agents and the primary agent) on 64 KB boundaries, the primary agent divides the LBA range by N*64 KB to distribute sub-requests to the N−1 secondary agents. Each of the N−1 secondary agents receives a respective sub-request with a starting divided-down LBA, a portion of the length corresponding to striping of data among the N agents, and optionally and/or selectively a remainder from dividing down the LBA; thus a first and/or a last of the secondary agents optionally process a transfer smaller than 64 KB.

Scalable Storage Devices

Figure 4:
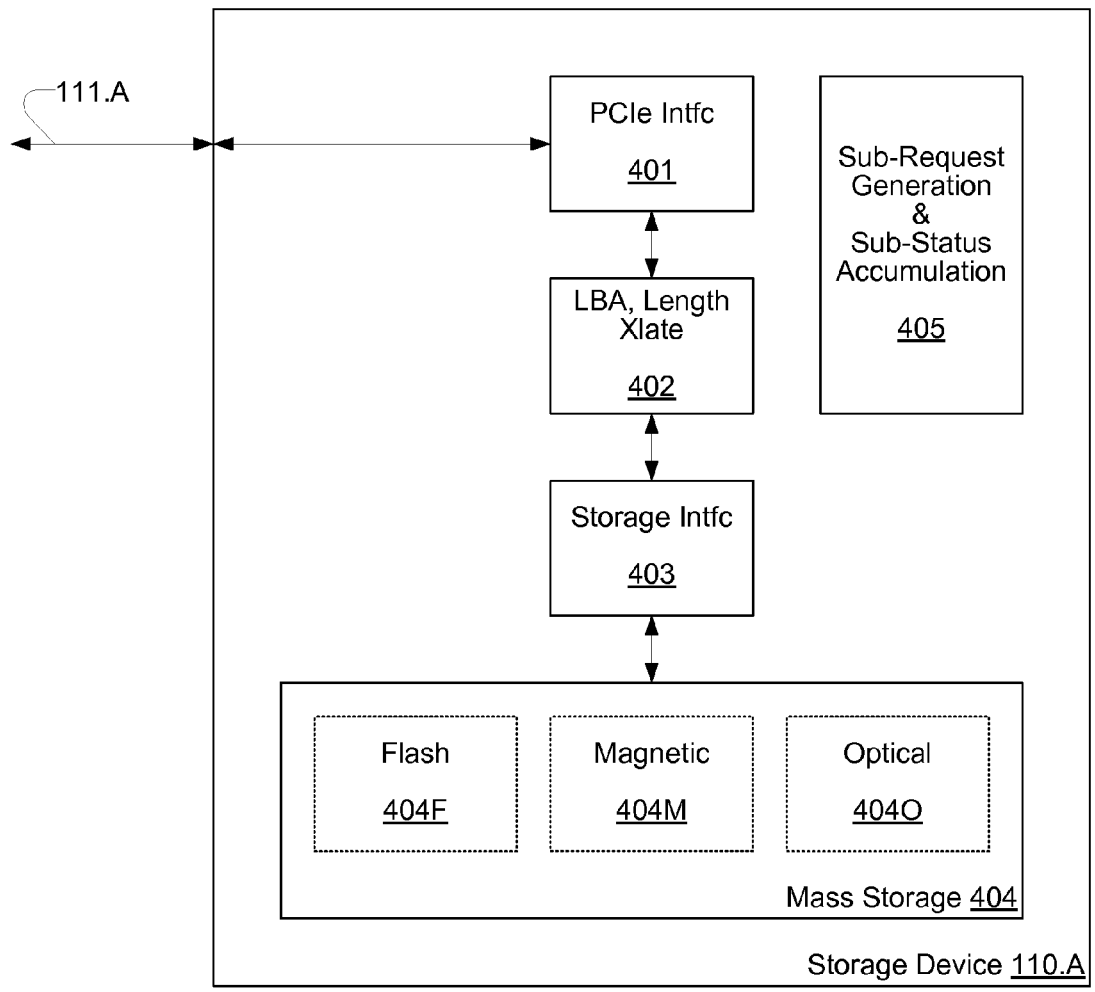
FIG. 4 illustrates selected structural details of an embodiment of a scalable storage device enabled to operate as a primary agent.

FIG. 4 illustrates selected structural details of an embodiment of a scalable storage device enabled to operate as a primary agent, specifically Storage Device 110.A of FIG. 1A. The storage device includes an interface to a PCIe bus (PCIe Intfc 401). The PCIe interface includes a DMA unit to enable optional and/or selective transfers directly between host memory and buffers of the PCIe interface, for example to read/write completion/status queue entries and/or to directly transfer data from/to host memory. The PCIe interface is coupled to a translation block (LBA, Length Xlate logic 402). The translation block is enabled to translate host storage address information (e.g. LBA and length) into local storage address information, such as described with respect to "Xlate to Local LBAs" 204 of FIG. 2. The translation block is coupled to a mass storage interface (Storage Intfc logic 403) that is coupled to one or more mass storage units (illustrated collectively as Mass Storage 404). The mass storage units include any one or more of a flash storage unit (Flash 404F), a magnetic disk storage unit (Magnetic 404M), an optical disk storage unit (Optical 404O), and/or any type of non-volatile storage unit. In various embodiments the flash storage unit comprises one or more flash memory chips and/or dice, such as NAND flash or NOR flash.

Storage Device 110.A includes a control block enabled to perform various operations relating to operation as a primary agent (Sub-Request Generation & Sub-Status Accumulation 405) that is optionally coupled to one or more of PCIe Intfc 401, LBA, Length Xlate logic 402, and Storage Intfc logic 403. The operations include, for example, implementing and/or managing all or any portions of processing associated with any one or more of the elements of "Primary Actions" 209 of FIG. 2. In some embodiments, Sub-Request Generation & Sub-Status Accumulation 405 implements one or more functions and/or mapping tables that track how host addresses are allocated to various secondary devices (such as the mapping tables used by "Forward to Secondary(s)" 207 of FIG. 2). The operations further include responding to host enquiries regarding storage capacity as if storage capacity implemented by one or more secondary agents (such as Storage Device 120.A of FIG. 5) were implemented by Storage Device 110.A.

Figure 5:
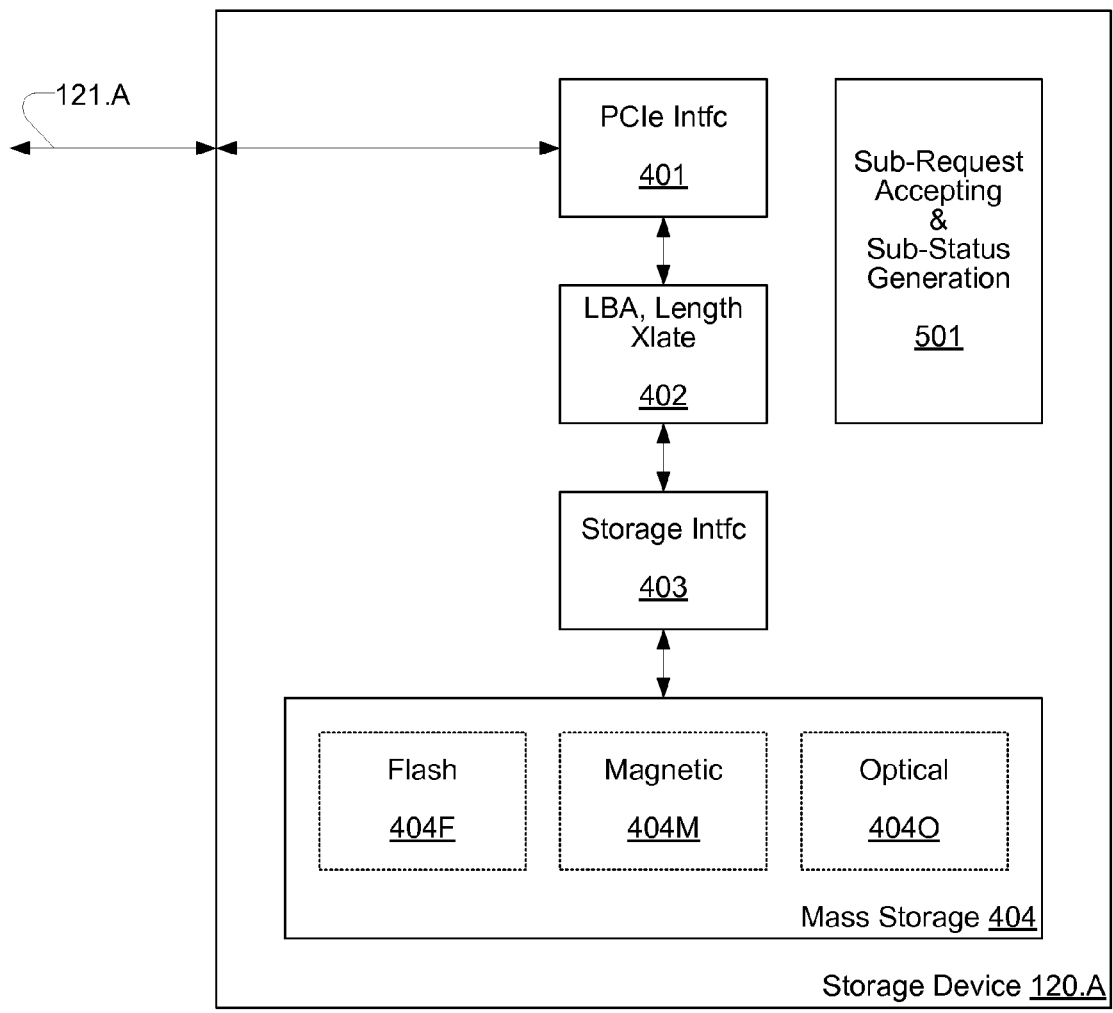
FIG. 5 illustrates selected structural details of an embodiment of a scalable storage device enabled to operate as a secondary agent.

FIG. 5 illustrates selected structural details of an embodiment of a scalable storage device enabled to operate as a secondary agent, such as Storage Device 120.A of FIG. 1A. The storage device includes some elements identical in operation and structure to similarly identified elements of FIG. 4 (PCIe Intfc 401, LBA, Length Xlate logic 402, Storage Intfc logic 403, and Mass Storage 404 having elements Flash 404F, Magnetic 404M, and 404O).

Storage Device 120.A includes a control block enabled to perform various operations relating to operation as a secondary agent (Sub-Request Accepting & Sub-Status Generation 501) that is optionally coupled to one or more of PCIe Intfc 401, LBA, Length Xlate logic 402, and Storage Intfc logic 403. The operations include, for example, implementing and/or managing all or any portions of processing associated with any one or more of the elements of "Secondary Actions" 219 of FIG. 2. The operations further include responding to host enquiries regarding storage capacity as if there were no storage implemented by Storage Device 120.A, or alternatively as if storage allocated for accessing by a host via a primary agent (rather than directly by the host) were not implemented by the storage device. Instead, the storage implemented by Storage Device 120.A is reported by a primary agent, such as Storage Device 110.A of FIG. 4.

In some embodiments (not illustrated), a configurable storage device includes elements corresponding to functionality of all of the elements illustrated in Storage Device 110.A of FIG. 4 and further includes elements corresponding to functionality of Sub-Request Accepting & Sub-Status Generation 501 of FIG. 5. An example configurable storage device includes PCIe Intfc 401, LBA, Length Xlate logic 402, Storage Intfc logic 403, and Mass Storage 404, as well as Sub-Request Generation & Sub-Status Accumulation 405 and Sub-Request Accepting & Sub-Status Generation 501. The configurable storage device is enabled to operate selectively as a primary agent or a secondary agent, for example in response to included mode state that is programmable. The mode state is programmable and/or alterable by various techniques, such as via the included PCIe interface by management software using special (e.g. vendor-specific) commands, via an initializing element such as non-volatile memory (e.g. flash memory or an option ROM), or via detection of an event by the configurable storage device and/or another storage device in communication with the configurable storage device. In some embodiments and/or usage scenarios, a configurable storage device enables a dynamic change in operating mode, such as a secondary agent dynamically replacing a failed primary agent, thus eliminating storage as a single point of failure.

Failure Scenarios

Several failure recovery techniques are enabled in various embodiments and/or usage scenarios where a primary agent as well as one or more secondary agents appear to a host as a single logical interface. The recovery techniques are either fully transparent to the host or are visible only to a device driver executing on the host.

A first failure recovery technique is applicable when a secondary agent fails wholly or partially, such that the failed secondary agent no longer implements a particular portion of storage. The primary agent becomes aware of the failure (e.g. the primary agent detects the failure or the failed secondary agent reports the failure to the primary agent). In response, the primary agent (re)allocates storage to implement the particular portion of storage, via allocation from storage of the primary agent and/or from zero or more of the secondary agents, optionally and/or selectively including the failed secondary agent. The primary agent and the secondary agents then operate according to any of the aforementioned embodiments and/or scenarios described with respect to FIGS. 1A, 1B, and 2-5.

In some situations, such as when a secondary agent fails such that the secondary agent is unable to contribute storage to the reallocation, the reallocation excludes the failed secondary agent. The secondary agent is unable to contribute storage for various reasons in various scenarios, such as having insufficient free storage that is operable, an inability to properly communicate with the primary agent and/or the host, physical removal, or total failure. In other situations, such as when a secondary agent partially fails and continues to implement at least some storage, the reallocation optionally includes storage of the partially failed second agent. In alternate related embodiments and/or usage scenarios, a device driver executing on the host becomes aware of the failure (rather than the primary agent) and informs the primary agent of the failure and/or directs the primary agent to perform a reallocation.

A second failure recovery technique is applicable when a primary agent fails wholly or partially, such that the primary agent no longer implements a particular portion of storage. The second failure recovery technique is similar to the first failure recovery technique, except that the reallocation is with respect to storage no longer implemented by the wholly or partially failing primary agent. As in the first failure recovery technique, the failure of the primary agent to properly implement storage is detectable by one or more of the primary agent, a secondary agent, or a device driver on a host.

A third failure recovery technique is applicable when a primary agent fails to properly act as a primary agent, e.g. to communicate information (e.g. sub-requests and/or sub-statuses) with one or more secondary agents and/or a host. A monitoring agent becomes aware of the failure and in response identifies another primary or secondary agent to act as a replacement primary agent. In some embodiments, the replacement primary agent is a hot spare. An example of the monitoring agent is another primary (or secondary) agent of a storage device that includes the failed primary agent. Another example of the monitoring agent is a device driver on a host, such as a device driver enabling communication between an OS and/or applications executing on the host and the failed primary agent prior to the failure. If the failed primary agent failure also results in the failed primary agent no longer implementing a particular portion of storage, then the replacement primary agent reallocates storage to implement the particular portion of storage, such as in the second failure recovery technique. The reallocation is via allocation from storage of any one or more of: the failed primary agent (if any storage remains operable in the failed primary agent), the replacement primary agent, and/or zero or more of the secondary agents. The replacement primary agent acts as the failed primary agent did before the failure, and operates according to any of the aforementioned embodiments and/or scenarios described with respect to FIGS. 1A, 1B, and 2-5.

A fourth failure recovery technique is enabled in a system with one or more configurable agents, and is applicable when a primary agent fails to properly act as a primary agent. An example of the configurable agent is a configurable storage device operable either as a primary agent or a secondary agent, such as based on a configurable storage device that conceptually includes all elements of FIG. 4 and FIG. 5. Similar to the third failure recovery technique, in response to a monitoring agent becoming aware of failure of a primary agent to properly act as a primary agent, the monitoring agent identifies one of the configurable agents to act as a replacement primary agent. The monitoring agent requests that the identified configurable agent be configured (e.g. via programming mode information) to operate as a replacement primary agent. The identified configurable element dynamically responds to the configuration change request and begins acting as a primary agent to perform as a replacement primary agent. Similar to the third failure recovery technique, if the failed primary agent failure also results in the failed primary agent no longer implementing a particular portion of storage, then the replacement primary agent reallocates storage to implement the particular portion of storage, such as in the second failure recovery technique. The replacement primary agent acts as the failed primary agent did before the failure, and operates according to any of the aforementioned embodiments and/or scenarios described with respect to FIGS. 1A, 1B, and 2-5.

In any one or more of the foregoing failure recovery techniques, after a failure, data is optionally recovered as possible via redundancy information. The data recovery is optionally via any combination of a host-side coupling (e.g. Host—Storage Device Coupling 180 of FIG. 1A or 1B) and a device-side coupling (e.g. Device—Storage Device Coupling 181 of FIG. 1B). As described elsewhere herein, the redundancy information is in accordance with, e.g., various RAID and/or mirroring implementations.

In any one or more of the foregoing failure recovery techniques, the reallocations optionally reduce free space available, e.g., as represented to the host.

In any one or more of the foregoing failure recovery techniques, any one or more of the reallocations are performed and/or are managed at least in part by a processor executing instructions.

In any one or more of the foregoing failure recovery techniques, recognition of a failure of a primary or a secondary agent is via one or more of: a specific detection of a failure by an agent, a failure to receive a heartbeat indication by an agent, and a higher-level indication that a failure has occurred. The specific detection includes any one or more of a primary agent, a secondary agent, or a device driver determination that another agent has failed, e.g. via determining that a status returned is inappropriate, a protocol has been violated, or a request has timed out.

In some embodiments where a transparent switch enables communication between a host and host visible storage, a failure of an element of the host visible storage is visible, e.g., to a device driver executing on the host. The device driver optionally participates in recovery from the failure. In some embodiments having a non-transparent switch between a host and host invisible storage, a failure of an element of the host invisible storage is invisible to the host. Recovery from the failure is optionally invisible to the host.

In various embodiments, all or any portions of operations performed by any of the elements of Host Visible Storage 110, Host Invisible Storage 120, Host Visible Storage 130, and Host Invisible Storage 140 of FIGS. 1A and 1B, as well as units and sub-units within, are managed and/or implemented by one or more processors executing instructions (such as firmware) stored in an optionally tangible computer-readable medium. For example, Sub-Request Generation & Sub-Status Accumulation 405 and/or Sub-Request Accepting & Sub-Status Generation 501 are managed and/or implemented by a processor executing instructions (such as firmware) stored in a computer-readable medium. Continuing with the example, the computer-readable medium is a portion of flash memory included in the scalable storage device (such as Flash 404F). In various embodiments, all or any portions of operations performed by any of the elements of Host Visible Storage 110, Host Invisible Storage 120, Host Visible Storage 130, and Host Invisible Storage 140 of FIGS. 1A and 1B, as well as units and sub-units within, are managed and/or implemented by one or more state-machines. For example, all or any portions of operations performed by Sub-Request Generation & Sub-Status Accumulation 405 and/or Sub-Request Accepting & Sub-Status Generation 501 are managed and/or implemented by one or more state-machines implemented at least in part by logic gate circuitry.

In various embodiments, all or any portions of a scalable storage system having one or more scalable storage devices (enabled to operate as primary and/or secondary agents) is implemented in one or more drawers and/or shelves of an equipment rack, such as in a datacenter. The scalable storage system is optionally enabled to operate with one or more hosts, such as computing complexes implemented in other drawers and/or shelves of the equipment rack.

Example Implementation Techniques

In some embodiments, various combinations of all or portions of operations performed by or blocks included in a scalable storage device (such as Storage Device 110.A of FIG. 4 or Storage Device 120.A of FIG. 5), and portions of a processor, microprocessor, system-on-a-chip, application-specific-integrated-circuit, hardware accelerator, or other circuitry providing all or portions of the aforementioned operations or blocks, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
host interface logic of a primary agent storage device visible to a host, the host interface logic enabled to interface to the host via a host-interface protocol and to interface to a secondary agent storage device invisible to the host via a peer-to-peer protocol, the interfacing to the host comprising reading a storage request from an entry in a submission queue, the interfacing to the secondary agent storage device comprising forwarding a storage sub-request to the secondary agent storage device, the interfacing to the host and the interfacing to the secondary agent storage device being via a same physical channel;
sub-request generation logic of the primary agent storage device enabled to generate the storage sub-request based at least in part on address information comprised in the storage request; and
storage capacity reporting logic of the primary agent storage device enabled to report back to the host a total storage capacity, the total storage capacity based at least in part on a storage capacity of the secondary agent storage device.

2. The system of claim 1, wherein the storage request comprises a read command with a first logical address, the storage sub-request comprises a corresponding read command with a different, second logical address, and the secondary agent storage device transfers data stored in mass storage of the secondary agent storage device directly to the host via the physical channel, the data corresponding to the second logical address.

3. The system of claim 1, further comprising one or more of the host, the secondary agent storage device, and a switch coupling the host to the secondary agent storage device.

4. The system of claim 1, the primary agent storage device further comprising storage interface logic and mass storage, the storage interface logic enabled to interface to the mass storage, and wherein the total storage capacity is further in accordance with a storage capacity of the mass storage.

5. The system of claim 1, wherein the interfacing to the host further comprises writing an overall status to an entry in a completion queue and the interfacing to the secondary agent storage device further comprises forwarding a sub-status from the secondary agent storage device to the host as at least part of the overall status via the writing of the overall status to the completion queue; and further comprising sub-status accumulation logic enabled to determine the overall status based at least in part on the sub-status.

6. The system of claim 1, wherein each of the primary and secondary agent storage devices is a Solid-State Disk (SSD).

7. A method comprising:
via host interface logic of a primary agent storage device accessible by a host, interfacing to the host via a host-interface protocol and interfacing to a secondary agent storage device inaccessible by the host via a peer-to-peer protocol, the interfacing to the host comprising reading a storage request from an entry in a submission queue, the interfacing to the secondary agent storage device comprising forwarding a storage sub-request to the secondary agent storage device, the interfacing to the host and the interfacing to the secondary agent storage device being via a same physical channel;
via sub-request generation logic of the primary agent storage device, generating the storage sub-request based at least in part on address information comprised in the storage request; and
via storage capacity reporting logic of the primary agent storage device, reporting back to the host a total storage capacity, the total storage capacity based at least in part on a storage capacity of the secondary agent storage device.

8. The method of claim 7, wherein the physical channel is compatible with at least one of a Peripheral Component Interconnect express (PCIe) channel and an Inifiniband channel.

9. The method of claim 7, further comprising detecting an error condition associated with the primary agent storage device, removing the primary agent storage device from service, and transitioning the secondary agent storage device from an inaccessible state to an accessible state with respect to the host so that the secondary agent storage device becomes a new primary agent storage device, and wherein the interfacing, generating and reporting steps are repeated for a new host request by the new primary agent storage device in conjunction with a different secondary agent storage device inaccessible to the host.

10. The method of claim 7, wherein the host is a first host to which the primary agent storage device is visible and to which the secondary agent storage device is invisible, and wherein the interfacing, generating and reporting steps are repeated using a second host to which the secondary agent storage device is visible and the primary agent storage device is invisible.

11. The method of claim 7, wherein the interfacing to the host further comprises writing an overall status to an entry in a completion queue and the interfacing to the secondary agent storage device further comprises forwarding a sub-status from the secondary agent storage device to the host as at least part of the overall status via the writing of the overall status to the completion queue; and further comprising, via sub-status accumulation logic, determining the overall status based at least in part on the sub-status.

12. The method of claim 7, wherein the primary agent storage device forms a portion of a first plurality of storage devices visible to the host, wherein the secondary agent storage device forms a portion of a second plurality of storage devices invisible to the host, each of the first and second plurality of storage devices characterized as a Solid-State Disk (SSD) coupled to the physical channel.

13. A storage system comprising a plurality of storage devices each having a controller and memory, the plurality of storage devices interconnected to a common physical channel via a peer-to-peer communication protocol, a first portion of the plurality of storage devices configured as primary agents visible to a host coupled to the physical channel, a second portion of the plurality of storage devices configured as secondary agents not visible to the host, wherein responsive to a storage request from the host to transfer user data between the host and at least a selected one of the plurality of storage devices, a selected primary agent generates and transfers a sub-request to a selected secondary agent, and responsive to the sub-request the selected secondary agent transfers user data directly to the host and transfers status information to the selected primary agent indicative of a storage capacity of the secondary agent.

14. The storage system of claim 13, wherein each of the plurality of storage devices is characterized as a Solid-State Disk (SSD) storage device.

15. The storage system of claim 13, wherein the plurality of storage devices further comprises a third portion which provide a combination of host visible storage and host invisible storage to the host.

16. The storage system of claim 13, wherein each of the primary agents comprise host interface logic configured to communicate with the host, sub-request generation logic configured to convert a received host storage request to a corresponding sub-request based on address information in the received host storage request, and storage capacity reporting logic configured to report a total storage capacity value to the host based on at least a storage capacity of the memory of the primary agent and a storage capacity of at least one secondary agent.

17. The storage system of claim 13, wherein at least one of the secondary agents in the second portion of the plurality of storage devices is configured to dynamically transition to a primary agent visible to the host responsive to a detected failure condition with a selected primary agent in the first portion of the plurality of storage devices.

18. The storage system of claim 13, wherein the plurality of storage devices store data arranged as RAID (redundant array of independent disks) data sets, and the sub-request issued to the secondary agent identifies a number of RAID updates to a selected RAID data set.

19. The storage system of claim 13, wherein the storage request from the host identifies a data set using a first logical address, wherein the selected primary agent modifies the storage request to identify the data set in the sub-request using a different, second logical address associated with the selected secondary agent, and the selected secondary agent transfers the data set from the associated memory of the selected secondary agent using the second logical address of the sub-request.

* * * * *